(12) United States Patent
Roviaro et al.

(10) Patent No.: US 10,173,409 B2
(45) Date of Patent: Jan. 8, 2019

(54) RAPID NOZZLE COOLING FOR ADDITIVE MANUFACTURING

(71) Applicant: SABIC GLOBAL TECHNOLOGIES B.V., Bergen op Zoom (NL)

(72) Inventors: John Roviaro, Savoy, MA (US); Thomas Hocker, Pittsfield, MA (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 13 days.

(21) Appl. No.: 15/531,859

(22) PCT Filed: Dec. 1, 2015

(86) PCT No.: PCT/IB2015/059261
§ 371 (c)(1),
(2) Date: May 31, 2017

(87) PCT Pub. No.: WO2016/088048
PCT Pub. Date: Jun. 9, 2016

(65) Prior Publication Data
US 2017/0266887 A1 Sep. 21, 2017

Related U.S. Application Data

(60) Provisional application No. 62/085,849, filed on Dec. 1, 2014.

(51) Int. Cl.
*B29C 64/209* (2017.01)
*B29C 64/30* (2017.01)
(Continued)

(52) U.S. Cl.
CPC ............ *B33Y 10/00* (2014.12); *B29C 64/106* (2017.08); *B29C 64/118* (2017.08); *B29C 64/20* (2017.08);
(Continued)

(58) Field of Classification Search
CPC ..... B29C 64/00; B29C 64/106; B29C 64/118; B29C 64/20; B29C 64/209; B29C 64/295;
(Continued)

(56) References Cited

U.S. PATENT DOCUMENTS 4,460,398 A * 7/1984 Sasaki ................. C03B 5/005
137/13
5,121,329 A * 6/1992 Crump ................. B22F 3/115
228/180.5

(Continued)

FOREIGN PATENT DOCUMENTS

CN   104085111 A   10/2014
EP    2705942 A1    3/2014
(Continued)

OTHER PUBLICATIONS

International Search Report for International Application No. PCT/IB2015/059261; International Filing Date: Dec. 1 2015; dated Feb. 23, 2016; 7 Pages.
(Continued)

*Primary Examiner* — Yogendra N Gupta
*Assistant Examiner* — Joseph S Leyson
(74) *Attorney, Agent, or Firm* — Cantor Colburn LLP

(57) ABSTRACT

Systems, devices, and methods according to the present disclosure are configured for use in additive manufacturing. Systems for additive manufacturing can include stand-alone manufacturing units, a series of units on an assembly line, or a high-capacity system with workflow automation features including a conveyor for transporting parts to or from a build area, or a robotic arm for transporting parts or adjusting a system component. An additive manufacturing system (100) can include a flow regulator (130) to change a temperature of a thermoplastic material at or in a tip (150) of a material extrusion nozzle cartridge (171), such as to enable or inhibit flow of the thermoplastic material from the tip. The flow regulator can be configured to provide a specified gas or liquid at a specified temperature, velocity, or volume.

20 Claims, 7 Drawing Sheets

(51) Int. Cl.
    *B33Y 10/00*     (2015.01)
    *B29C 64/118*     (2017.01)
    *B29C 64/106*     (2017.01)
    *B29C 64/20*     (2017.01)
    *B33Y 30/00*     (2015.01)
    *B33Y 50/02*     (2015.01)
    *B29C 67/00*     (2017.01)

(52) U.S. Cl.
    CPC ............ *B29C 64/209* (2017.08); *B29C 64/30* (2017.08); *B29C 67/0055* (2013.01); *B29C 67/0088* (2013.01); *B33Y 30/00* (2014.12); *B33Y 50/02* (2014.12)

(58) Field of Classification Search
    CPC ..... B29C 64/30; B29C 64/343; B29C 64/386; B29C 64/393; B33Y 10/00; B33Y 30/00; B33Y 50/02
    See application file for complete search history.

(56) References Cited

U.S. PATENT DOCUMENTS

| | | |
|---|---|---|
| 5,303,141 A | 4/1994 | Batchelder et al. |
| 6,004,124 A | 12/1999 | Swanson et al. |
| 6,578,596 B1 | 6/2003 | Batchelder et al. |
| 7,604,470 B2 | 10/2009 | Labossiere et al. |
| 7,767,738 B2 | 8/2010 | Gaggar et al. |
| 7,897,074 B2 | 3/2011 | Batchelder et al. |
| 9,649,811 B2 | 5/2017 | Napadensky |
| 2007/0228590 A1 | 10/2007 | Labossiere et al. |
| 2012/0018924 A1 | 1/2012 | Swanson et al. |
| 2012/0080814 A1 | 4/2012 | Sun et al. |
| 2012/0162314 A1 | 6/2012 | Swanson et al. |
| 2013/0073073 A1 | 3/2013 | Pettis |
| 2013/0089642 A1 | 4/2013 | Lipson et al. |

FOREIGN PATENT DOCUMENTS

| | | |
|---|---|---|
| WO | 2016088042 A1 | 6/2016 |
| WO | 2016088049 A1 | 6/2016 |
| WO | 2016088051 A1 | 6/2016 |
| WO | 2016097911 A1 | 6/2016 |

OTHER PUBLICATIONS

Machine Translation of EP2705942; Date of Publication: Mar. 12, 2014; 13 Pages.
U.S. Appl. No. 61/931,033 to Wen et al; Filed Jan. 24, 2014; 33 Pages.
Written Opinion of the International Searching Authority for International Application No. PCT/IB2015/059261; International Filing Date: Dec. 1, 2015; dated Feb. 23, 2016; 6 Pages.
Machine Translation of CN104085111(A); Date of Publication: Oct. 8, 2014; 6 Pages.

\* cited by examiner

RAPID NOZZLE COOLING FOR ADDITIVE MANUFACTURING

CLAIM OF PRIORITY

This application is a 371 of International Application No. PCT/IB2015/059261, filed Dec. 1, 2015, which claims the benefit of priority under 35 U.S.C. § 119(e) to U.S. Provisional Patent Application Ser. No. 62/085,849, filed on Dec. 1, 2014 both of which are incorporated herein by reference.

BACKGROUND

Additive manufacturing, or three-dimensional (3D) printing, is a production technology for using an automated system to make a solid object based on a digital model. Generally, computer-aided design (CAD) modeling software is used to create the digital model of a desired solid object. Instructions for an additive manufacturing system are then created based on the digital model, for example by virtually "slicing" the digital model into cross-sections or layers. The layers can be formed or deposited in a sequential process in an additive manufacturing device to create the object.

Additive manufacturing processes offer many advantages, including potentially reducing a time period from a design phase to a prototype or commercialization phase. Design changes can be made throughout the development process based on a physical prototype rather than based on a digital model only or based on a prototype made from an expensive production tool. Generally, no specialized tooling is required because the same extrusion head in an additive manufacturing system can be used to create part composites having many different shapes, sizes and configurations. In some examples, additive manufacturing can be used to reduce a part inventory. Using additive manufacturing, some parts can be quickly made on-demand or on-site.

Various polymers can be used in additive manufacturing, including polymers having different colors, molecular weights, flame resistance characteristics, or other characteristics. Some part composites are made using a monofilament additive manufacturing technique (for example, in fused deposition modeling (FDM) or fused filament fabrication (FFF)). A monofilament can include a material strand that is about 0.1 to 3.0 mm in diameter. Some monofilament materials can bond under heat and atmospheric pressure to create a part composite that has a high degree of interaction between strand surfaces, with a small portion of voids in the bonded strands.

Various systems and methods have been proposed for regulating flow of a thermoplastic material in an additive manufacturing system. Batchelder et al., in U.S. Pat. No. 6,578,596, titled "Apparatus and Method for Thermoplastic extrusion", refers to a thermoplastic flow channel, in an extrusion head, that extends from a thermoplastic supply manifold to a discharge orifice. Batchelder et al. further refers to using a coolant at an intermediate location between the supply manifold and the discharge orifice to open or close the flow channel. Labossiere et al., in U.S. Pat. No. 7,604,470, titled "Single-motor Extrusion Head Having Multiple Extrusion Lines", refers to supplying cooling air from an airflow manifold to cool an extruded flow of material to improve fusion with previously-deposited material.

OVERVIEW

The present inventors have recognized, among other things, that a problem to be solved includes increasing throughput and efficiency in an additive manufacturing system. The present subject matter can help provide a solution to this problem, such as by reducing a switching time between extrusions of two or more different materials, including reducing a switching time between extrusion of a support material and a model material. The systems and methods described herein can be used for changing a temperature of a thermoplastic material at or in a tip of a nozzle cartridge to reduce a material switching time, or to facilitate another nozzle cartridge process or change event, such as a material change or purge event.

Changing a temperature of a thermoplastic material at or in a nozzle cartridge tip can change a flow characteristic of the material. For example, when the thermoplastic material in a tip is heated to a temperature at or above a flow threshold temperature of the material, the thermoplastic material can be at least partially liquefied, and a build event can be initiated or performed by extruding or depositing the thermoplastic material from the tip. When the temperature of the thermoplastic material in the tip is decreased, the thermoplastic material can be hardened into a substantially solid state, and material flow from the tip can be stopped or inhibited.

One or more flow regulators can be provided in an additive manufacturing system for releasing a heated or cooled liquid or gas in the direction of an exit orifice of a nozzle tip. The one or more flow regulators can be positioned at fixed locations in the system, or the flow regulators can be movable. In some examples, a flow regulator can be integrated with a nozzle cartridge, or a flow regulator can be integrated with an extrusion head assembly to which a nozzle cartridge is attached.

In an example, a method for creating a three-dimensional part, such as using an additive manufacturing system according to the present disclosure, can include preheating at least a first portion of a first nozzle cartridge when the first nozzle cartridge is outside of a build area of the system. The method can include positioning the first nozzle cartridge in the build area and providing a heated gas or heated liquid at the nozzle tip to enable a flow of thermoplastic material from the nozzle cartridge, such as to perform a first portion of a build event. The method can further include providing a cooled gas or cooled liquid at the nozzle tip to inhibit flow of the thermoplastic material from the nozzle cartridge when the first portion of the build event is completed.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
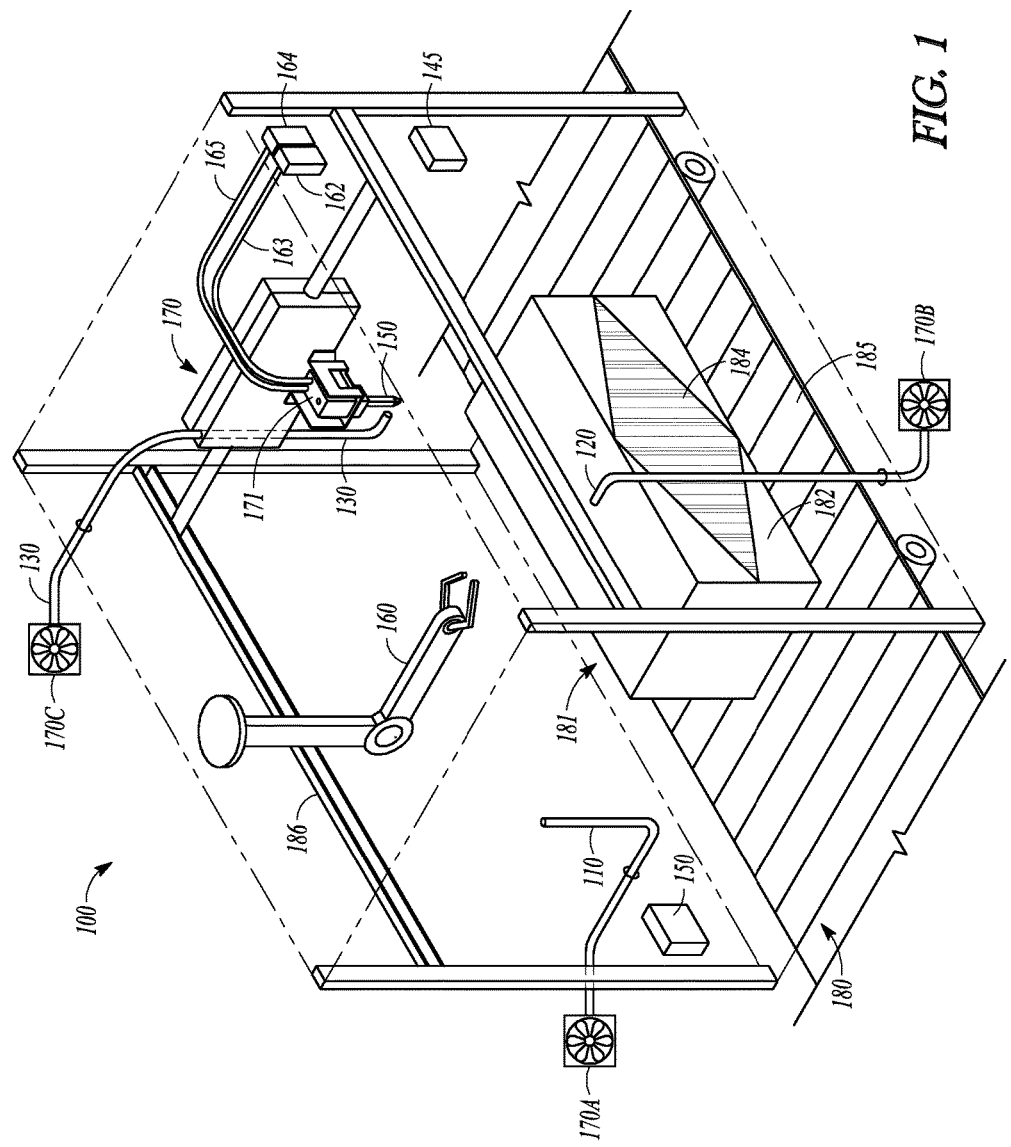
FIG. 1 illustrates generally an example of an additive manufacturing system that includes multiple flow regulators.

This detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of the elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the claims, the terms "first," "second," and "third," etc. are used merely as labels, and are not intended to impose numerical requirements on their objects. All cited patents, patent applications, and other references are incorporated herein by reference in their entirety. In the event of inconsistent usages between this document and any documents so incorporated by reference, the usage in this document controls.

Systems, devices, and methods according to the present disclosure are configured primarily for use in additive manufacturing (AM), also referred to as material extrusion additive manufacturing, deposition modeling, or three-dimensional (3D) printing. Without limiting the scope of the present disclosure, systems for additive manufacturing can include stand-alone manufacturing or printing units, a series of units on an assembly line, or a high volume system for additive manufacturing that includes one or more workflow automation features such as a conveyor for transporting parts to or from a build area, or a robot (e.g., a robotic arm) for transporting parts or adjusting a system component.

Polymeric materials can be used in the additive manufacturing systems described herein. Polymeric materials can include high-performance engineering thermoplastic polymers such as polycarbonate-based polymers (PC), polymethyl methacrylate polymers (PMMA), polyethylene terephthalate polymers (PET), polybutylene terephthalate polymers (PBT), styrene polymers, polyetherimide (PEI), acrylic-styrene-acrylonitrile polymers (ASA), and acrylonitrile-butadiene-styrene polymers (ABS), among others. The polymeric materials can include blends of these polymers together or with other polymers: for example a blend of polycarbonate and acrylonitrile-butadiene-styrene (PC/ABS), commercially available under the trade name CYCOLOY from the Innovative Plastics division of SABIC; a blend of polyphenylene ether (PPE) with other polymers, such as polystyrene, as in the blend of PPE and high-impact polystyrene (HIPS) commercially available under the trade name NORYL from the Innovative Plastics division of SABIC, or with polyamide, as in the PPE/polyamide blend available under the trade name NORYL GTX from the Innovative Plastics division of SABIC, or with polypropylene (PP), as in the PPE/PP blend commercially available under the trade name NORYL PPX from the Innovative Plastics division of SABIC. The polymeric materials can include copolymers of these polymeric base materials together or with other polymers, such as a block copolymer of PEI and siloxane, for example the amorphous block copolymer of PEI and siloxane soft-blocks commercially available under the trade name SILTEM from the Innovative Plastics division of SABIC. Polymeric and other materials, such as those suitable for use with the additive manufacturing systems and methods of the present disclosure, are discussed at length below.

Additive manufacturing systems can include, among others, systems configured to perform fused deposition modeling, or FDM. FDM is an additive process in which layers of one or more materials are successively deposited and fused together to form a part composite. Materials suitable for FDM include production-grade thermoplastics such as ABS, ASA, PC, PEI, Ultem, PET, or PBT, polyimide (e.g., EXTEM), among others. Support material used in FDM can optionally be water based.

Some examples of additive manufacturing systems include Polyjet, Selective Laser Sintering, Multijet Modeling, and Stereolithography systems. Polyjet is an additive process that uses a UV-cured photopolymer resin that can be deposited using a print head. In Selective Laser Sintering, or SLS, powdered metal or ceramic materials can be deposited and cured, such as using a laser to melt a surface of a powered material. Some materials suitable for SLS processes include nylon, titanium, and brass. In Multijet Modeling, or MJM, a microscopic layer of resin is deposited on a support made of wax, and the wax can be melted away from the part composite. In Stereolithography, a laser can be used to cure a deposited resin material. These additive manufacturing systems and others can be improved or made more efficient by employing the systems and methods described herein.

The present inventors have recognized that one way to improve throughput in an additive manufacturing system includes reducing a switching time between extrusion of two or more different materials, including reducing a switching time between extrusion of a support material and a model material. The systems and methods described herein can be used for rapidly changing a temperature of a thermoplastic material at or in a tip of a nozzle cartridge, such as to reduce a material switching time, or to facilitate another nozzle cartridge process or change event, such as a material change or purge event. Changing a temperature of a thermoplastic material at or in the tip can change a flow characteristic of the material. For example, when the temperature of the material is increased, the thermoplastic material can be at least partially liquefied, and a build event can be performed by extruding or depositing the thermoplastic material from the tip. When the temperature of the material is decreased, the thermoplastic material can be hardened into a substantially solid state, and material flow from the tip can be stopped.

Various systems can be used to provide a rapid temperature change of a thermoplastic in a tip of a nozzle cartridge. A gas or liquid can be cooled or heated, and then the gas or liquid can be delivered to a tip region of a nozzle cartridge. In an example, the gas or liquid is delivered to an outlet (that is, exit orifice or discharge orifice) of a nozzle tip such that the cooled or heated material contacts any thermoplastic material at or in the tip. A system of manifolds can be provided to direct the gas or liquid from respective sources, through one or more manifold exit outlets or orifices, and toward a nozzle tip. In some examples, a manifold and/or exit orifice for delivering the gas or liquid is coupled to an extrusion head assembly or a nozzle cartridge such that the exit orifice moves with the nozzle cartridge in an additive manufacturing system. In some examples, a manifold and/or exit orifice for delivering the gas or liquid is fixed in place in the additive manufacturing system, and a nozzle cartridge or extrusion head assembly can be moved from a build area of the additive manufacturing system to a position proximal the exit orifice to receive the cooled or heated gas or liquid.

In an example, a rapid thermoplastic material temperature change can be provided using one or more jets of cooled gas or liquid at a nozzle tip where any liquid or semi-liquid thermoplastic material can remain after a build event performed using the same nozzle tip. When one or more jets contact the remaining thermoplastic, the thermoplastic can be hardened in place to prevent or inhibit further flow from the nozzle tip. In an example, the cooled jet can contact the thermoplastic as soon as a build event is completed, such as when a heater or liquefier corresponding to the same nozzle cartridge is not yet cooled to a temperature that is below a phase transition temperature of the thermoplastic in the nozzle cartridge.

After a build event, rapidly changing a temperature of a thermoplastic material at a tip of a nozzle cartridge can help to expedite subsequent nozzle cartridge processing, such as including a material or nozzle cartridge change after the build event. Prior cooling techniques include switching off a liquefier assembly and waiting a specified period of time for material at a nozzle tip to sufficiently solidify before further processing the nozzle cartridge, such as before moving the nozzle cartridge out of the build area of the system, or before exchanging the nozzle cartridge with a different cartridge at the head assembly. In some examples, a flow channel inside of the nozzle cartridge, between a thermoplastic supply manifold and the nozzle tip, can receive a coolant to inhibit flow of thermoplastic material. In these examples, the time to sufficiently cool the nozzle cartridge, and thereby the thermoplastic, could be 30 seconds or more. Thus, in additive manufacturing systems that alternately deposit model and support material in layer thicknesses of about ten to twenty thousandths of an inch, up to 25 minutes or more of time can be spent cooling a nozzle cartridge between model and support deposits per inch of material deposited.

Using the present systems and methods, a cooled material can be delivered to a thermoplastic material in a tip of a nozzle cartridge to more rapidly change a flow characteristic of that thermoplastic material. For example, a flow characteristic of the thermoplastic material can be changed almost immediately (e.g., within a few seconds or milliseconds) in response to the cooled material being delivered to the thermoplastic in the tip. By rapidly lowering the temperature of the thermoplastic material at the tip to at least partially solidify the material, thermoplastic material flow can be stopped. With the flow arrested, the nozzle cartridge can then be moved or processed without a risk of unintentionally leaking thermoplastic material from the tip.

In an example, a rapid thermoplastic material temperature change can be provided using one or more jets of heated gas or liquid at a nozzle tip where any hardened or semi-liquid thermoplastic material can be disposed before a build event. When the one or more jets contact the hardened or semi-liquid thermoplastic at the nozzle tip, the thermoplastic can be substantially liquefied to facilitate or enable flow of the thermoplastic material from the nozzle tip. In an example, flow from the one or more jets of heat gas or liquid can be coordinated with a heater or liquefier assembly in the nozzle cartridge such that thermoplastic material in a liquefaction chamber of the nozzle cartridge can be available to flow (e.g., from the nozzle cartridge tip to create a part composite in a build event) when the heated gas or liquid released to enable the thermoplastic flow.

Before a build event, increasing a temperature of a thermoplastic material at a tip of a nozzle cartridge can help to initiate a build event. Prior heating techniques include switching on a liquefier assembly and waiting a specified period of time for thermoplastic material in the liquefier assembly to sufficiently liquefy such that the material can be flowed through a channel in the nozzle cartridge and out of the nozzle tip. In some examples, a flow channel inside of the nozzle cartridge, between a thermoplastic supply manifold and the nozzle tip, can be heated to permit flow of thermoplastic material. In these examples, the time to sufficiently heat the nozzle cartridge and thereby the thermoplastic inside of the cartridge could be 30 seconds or more. Using the present systems and methods, a heated material can be delivered to a thermoplastic material in a tip of a nozzle cartridge to more rapidly change a flow characteristic of that thermoplastic material. For example, a flow characteristic of the thermoplastic material can be changed almost immediately (e.g., within a few seconds or milliseconds) in response to the heated material being delivered to the thermoplastic in the tip. By rapidly raising the temperature of the thermoplastic material at the tip to at least partially liquefy the material, thermoplastic material flow can be initiated. With the flow initiated, the nozzle cartridge can then be moved into a build area to deposit material for a part composite.

In some examples, a liquefier assembly can be used to pre-heat a thermoplastic material in a nozzle cartridge as the cartridge is moved into position for a build event. Once the nozzle cartridge is in a proper position for the build event, the heated gas or liquid can be released to heat the thermoplastic in the tip of the nozzle cartridge and to initiate the build event.

Various gas or liquid materials can be used to change a temperature of a thermoplastic material at a tip of a nozzle cartridge. Generally, a suitable gas or liquid can be characterized as having a high boiling point, a low freezing point, stability over a range of temperatures, high specific heat, and good thermal conductivity. Suitable gas or liquid materials can have low viscosity to promote rapid flow through a manifold, conduit, or other portion of a gas or liquid distribution system. Some gases that can be used include carbon dioxide, hydrogen, argon, nitrogen, fluoroalkane gases, or pressurized ambient air. Some liquids that can be used include water (e.g., deionized water), glycol, glycerol, Freon, liquefied carbon dioxide, liquid nitrogen, liquid hydrogen, or nanofluids (e.g., a carrier liquid, such as water, having nanoparticles with improved heat transfer characteristics).

In an example, a cooled or heated gas or liquid can be released from an exit orifice of a flow regulator at a specified speed and volume, and for a specified duration. For example, a supercooled gas, such as carbon dioxide, can be released at a specified minimum rate for a specified minimum duration to substantially solidify a portion of the thermoplastic material in a tip of a nozzle cartridge. The duration, or one or more of the flow characteristics of the released gas, can be selected or adjusted based on multiple factors, including one or more of a type of thermoplastic material in the tip, a measured or estimated temperature of the thermoplastic material in the tip, a duration since a previous build event using the tip, a distance between an exit orifice of the flow regulator and the tip, or a quantity of thermoplastic material in the nozzle cartridge to influence using the cooled gas.

Various systems and methods can be provided to deliver or to facilitate delivery of a gas or liquid from a flow regulator to change a temperature of a thermoplastic at a nozzle cartridge tip. In an example, a gas or liquid flow regulator can be disposed on or integrated with a nozzle cartridge or an extrusion head assembly. In an example, a gas or liquid flow regulator can be disposed at a fixed location that is at or near a build area of an additive manufacturing system. An automated portion of the system (e.g., a robotic arm, gantry system, or other mover) can be used to move a nozzle cartridge between the flow regulator and the build area. In an example, a flow regulator can include a nozzle cartridge bath area having a liquid pool or reservoir that is configured to retain a liquid and receive at least a tip portion of a nozzle cartridge.

Various additive manufacturing systems can be used with the systems, devices, and methods described above for facilitating or expediting a material temperature change at a nozzle cartridge. For example, FIG. 1 illustrates generally an example of a portion of an additive manufacturing system 100 that can be used. The system 100 includes a build area 180, a movable extrusion head assembly 170, and a system control circuit 190. The extrusion head assembly 170 is movable within the build area 180 in response to instructions from the system control circuit 190. The system control circuit 190 can include, among other things, a processor circuit or information gateway that can provide instructions to the extrusion head assembly 170, or to other portions of the system 100, and the instructions can be interpreted and used by one or more portions of the system 100 to create or process a part composite 181. The part composite 181 can include one or more of a support material 182 and a model material 184.

The extrusion head assembly 170 can include, or can be configured to be coupled to, one or more nozzle cartridges. For example, the extrusion head assembly 170 can include a nozzle cartridge chassis that is configured to receive and retain a nozzle cartridge for use in a build event. A nozzle cartridge generally includes a raw material input, a liquefier for heating successive portions of raw material, and a nozzle tip for dispensing the heated material. In some examples, the nozzle cartridge is configured to receive a polymer filament at the raw material input. A nozzle cartridge can be configured to dispense multiple different types of materials, or a nozzle cartridge can be configured to dispense a specified single material. In an example, a nozzle cartridge can include a nozzle tip that is configured for dispensing a specified material, or range of materials, at a specified material dispensing rate or temperature.

The extrusion head assembly 170 can optionally include a liquefier assembly, a temperature control device, or a drive assembly. The liquefier assembly can be used to liquefy a material supplied (e.g., in filament form) to the extrusion head assembly 170 from a material source. The temperature control device can optionally be used to heat the liquefier assembly, or to heat a portion of a nozzle cartridge that is installed in a chassis of the extrusion head assembly 170.

The build area 180 can include, among other features, a build sheet 185 and an x-y gantry 186. In some examples, the build sheet 185 includes a portion of a conveyor belt surface, and the conveyor belt is movable from the build area 180 to one or more downstream part composite processing areas. The build sheet 185 can optionally be movable along a vertical z-axis, such as in response to instructions received from the system control circuit 190, such as by adjusting a vertical position of a platform or, in the case of a conveyor, one or more rollers upon which the belt moves.

The x-y gantry 186 can include a guide rail system that is configured to move the extrusion head assembly 170 in a horizontal x-y plane within the build area 180. In some examples, the x-y gantry 186 or the extrusion head assembly 170 can be additionally movable along the vertical z-axis. In some examples, the build sheet 185 can be movable in the horizontal x-y plane within the build area 180, and the extrusion head assembly 170 can be movable along the vertical z-axis. Other arrangements can additionally or alternatively be used such that one or both of the build sheet 185 and the extrusion head assembly 170 are moveable relative to the other.

The extrusion head assembly 170 is supported by the x-y gantry 186 in the example of FIG. 1, and the extrusion head assembly 170 is movable in the horizontal x-y plane to create the part composite 181 in a layer-by-layer manner using one or more of the model material 184 and the support material 182.

In the example of FIG. 1, the first nozzle cartridge 171 can be configured to receive multiple filament materials. A support material filament can be routed from a support material source 162, optionally using a first filament conduit 163, to the first nozzle cartridge 171. A model or part material filament can be routed from a model material source 164, optionally using a second filament conduit 165, to the first nozzle cartridge 171. The material sources can include respective spools of filament polymer (and/or support material) that can be driven or drawn through the respective filament conduits to a specified nozzle cartridge in the system 100.

The support and model materials 182 and 184 can be provided to system 100 in various media or configurations. For example, the materials can be supplied in the form of a continuous filament, such as on a spool in a filament cassette. A filament, such as having a circular cross section, can have any one or more of various diameters, such as ranging from about 1 millimeter or less to about 3 millimeters or more. In an example, at least one of the material sources can include a raw material in some form other than a filament, such as in pellet form. A conduit suitable for transporting one or more of a solid pellet or a flowable polymer can be used to exchange the raw material between a source and a nozzle cartridge.

Support material 182 or model material 184 can be deposited onto the build sheet 185 to create the part composite 181. As referred to herein, a part composite can include one or both of the support material 182 and the model material 184. Generally, support material 182 is deposited to provide vertical support along the z-axis, such as for overhanging portions or layers of the model material 184. After a layer is deposited, or a build operation is complete, the resulting part composite 181 can be removed from the build area 180, such as manually by an operator, automatically using a conveyor that includes the build sheet 185, automatically using a robotic arm, or using some other device to relocate the part composite 181. The support material 182 can be separated from the model material 184 before or after the part composite is removed from the build area 180. In some examples, the support material 182 can be automatically removed, dissolved, or otherwise detached from the model material 184. Systems and methods for automatically removing support material 182 are described in Hocker, U.S. Provisional Patent Application No. 62/085,833, titled "ADDITIVE MANUFACTURING PROCESS AUTOMATION SYSTEMS AND METHODS", and filed on the same date as the present application.

The control circuit 190 can include a processor circuit or a software module (e.g., code embodied (1) on a non-transitory machine-readable medium or (2) in a transmission signal) or a hardware-implemented module. A hardware-implemented module can include a tangible unit capable of performing various, programmable operations. In some examples, one or more computer systems (e.g., including a standalone, target or server computer system) or one or more processor circuits may be configured by software (e.g., an application or application portion) as a hardware-implemented module that operates to perform operations as described herein.

In some examples, the hardware-implemented module can be implemented mechanically or electronically. For example, the hardware-implemented module can include dedicated circuitry or logic that is permanently configured, for example, as a special-purpose processor circuit, such as a field programmable gate array (FPGA) or an application-specific integrated circuit (ASIC), to perform specified operations. The hardware-implemented module can include programmable logic or circuitry (e.g., as encompassed within a general-purpose processor or other programmable processor) that can be temporarily configured by software to perform certain operations. The decision to implement a hardware-implemented module mechanically, in dedicated and permanently configured circuitry, or in temporarily configured circuitry (e.g., configured by software) may be driven by cost and time considerations.

The various operations and methods described herein may be performed, at least partially, by one or more control or processor circuits that are temporarily configured (e.g., by software) or permanently configured to perform the relevant operations. Whether temporarily or permanently configured, such processor circuits may constitute processor-implemented modules that operate to perform one or more operations or functions. The performance of certain ones of the operations described herein can optionally be distributed among two or more processors or control circuits, not only residing within a single machine, but deployed across a number of machines, such as including in different portions of an additive manufacturing system. For example, although referred to generally herein as a control circuit 190, the circuit can include a module at or near the build area 180 to provide feedback or instructions to the extrusion head assembly 170 about a built event status, and the circuit can include a module in a post-processing or other downstream area of the system.

Although the system 100 is shown with one nozzle cartridge, a system can include an extrusion head assembly 170 having multiple nozzle cartridges, and one or more of the cartridges can optionally be removable from the extrusion head assembly 170. The extrusion head assembly 170 can include one or more nozzle cartridge drive assemblies for providing material to one or more respective nozzle cartridges. In an example, a first nozzle cartridge drive assembly includes a pair of drive wheels that are spaced apart and are configured to receive a filament, such as from the support material source 162. As the drive wheels rotate, the support material can be drawn from the source and fed into the first nozzle cartridge 171. In other examples, a nozzle cartridge can include an integrated or on-board drive assembly. By providing a drive assembly on the extrusion head assembly, however, a part count, weight, and complexity associated with each nozzle cartridge can be minimized.

In an example, a nozzle cartridge can be detachable from the extrusion head assembly 170, and can be replaced with another, similarly sized and shaped nozzle cartridge. One or more nozzle cartridges can be changed over the course of a build process. For example, the first nozzle cartridge 171 can be automatically decoupled from the extrusion head assembly 170 and replaced with a different nozzle cartridge, such as while a second nozzle cartridge is engaged in a material deposition process. The different nozzle cartridge can optionally be preheated such that as soon as the different nozzle cartridge is coupled to the extrusion head assembly 170 and moved into position to perform a deposition process, the different nozzle cartridge can begin depositing material. In this manner, tool or material changes can be made quickly and seamlessly during a build process.

Some parts can be made from multiple different raw materials, including materials having different shapes, different chemical structures, different melting points, different extrusion or curing characteristics, different colors, or other different characteristics. In some examples, efficiencies can be gained by dedicating or configuring a specified nozzle cartridge for depositing a specified type of material, rather than to change one or more operating characteristics (e.g., a liquefier operating temperature, an extrusion tip configuration, a drive mechanism, etc.) of that nozzle cartridge at each material change. In systems where a nozzle cartridge is dedicated to dispensing a particular material, material supply efficiencies can be similarly realized as raw materials need not be routinely purged from a supply conduit or liquefier assembly at a material change event. One or more nozzle cartridges having dedicated material supplies or operating characteristic set points can be stored in a holding area, such as in or near the build area 180 of the system 100, until such nozzle cartridge is needed in a build process. Once a specified nozzle cartridge (or corresponding material type) is indicated for use, the nozzle cartridge can be automatically prepared (e.g., preheated) or coupled to the extrusion head assembly 170 and then used to deposit its corresponding material. In this manner, a build process can seamlessly, and without user intervention, use multiple different material types, applied in multiple different ways, without lengthy delays during changeovers or system reconfigurations, such as due to preheating lag times. Systems and methods for using multiple nozzle cartridges in coordination with a nozzle tray are described in Hocker, U.S. Provisional Patent Application No. 62/085,843, titled "NOZZLE TOOL CHANGING FOR MATERIAL EXTRUSION ADDITIVE MANUFACTURING", and filed on the same date as the present application.

The system 100 in the example of FIG. 1 includes multiple flow regulators that are positioned to provide at least one of an air or a liquid in the direction of a thermoplastic material in a tip 150 of the nozzle cartridge 171. The provided air or liquid can be heated or cooled, such as before the air or liquid is released from one of the flow regulators toward the thermoplastic material in the tip 150. In an example, a first movable flow regulator 130 includes a flow regulator that is coupled to one of the nozzle cartridge 171 and the extrusion head assembly 170. The flow regulator is "movable" because it moves substantially with the nozzle cartridge 171 to deliver a gas or liquid flow to thermoplastic at the tip of the nozzle cartridge 171. The first movable flow regulator 130 is optionally movable substantially in a z-direction to lower a flow orifice and release a gas or liquid stream in the direction of the thermoplastic material in the tip 150. When the nozzle cartridge 171 is used in a build event, the first movable flow regulator 130 can be moved substantially in the z-direction to withdraw the flow orifice from the build area 180.

The example 100 of FIG. 1 further illustrates first and second stationary flow regulators 110 and 120. The first and second stationary flow regulators 110 and 120 include exit orifices that are substantially fixed in or near the build area 180 of the system 100. The nozzle cartridge 171 can be driven to one or the other of the first and second stationary flow regulators 110 and 120, such as using the x-y gantry system 186, or using the robotic arm 160. In the example of FIG. 1, the first and second stationary flow regulators 110 and 120 are configured to provide a gas or liquid stream in the direction of a thermoplastic material at the tip 150 when the extrusion head assembly 170 is located at substantially opposite ends of its available travel.

The first movable flow regulator 130, and the first and second stationary flow regulators 110 and 120, can receive an air or liquid from a single source or from multiple different discrete sources. In the example of FIG. 1, each of the flow regulators is configured to deliver a gas, and each receives air from a different source or blower. For example, the first stationary flow regulator 110 can receive a coolant gas from a first regulator source 169A, the second stationary flow regulator 120 can receive a second coolant gas from a second regulator source 169B, and the first movable flow regulator 130 can receive a heated gas from a third regulator source 169C.

The system of FIG. 1 can optionally include one or more temperature sensors to provide information about heating or cooling of different parts of the system 100. For example, a temperature sensor can be integrated with one or more portions of a nozzle cartridge. In the system 100, a non-contact temperature sensor 145, such as an IR temperature sensor, is configured to receive information about the tip 150 such as when the tip 150 is disposed remotely from the non-contact temperature sensor 145. Information from a temperature sensor can optionally be used, such as by the system control circuit 190, to identify whether to provide a gas or liquid, in a heated or cooled state, to the tip 150.

Figure 2:
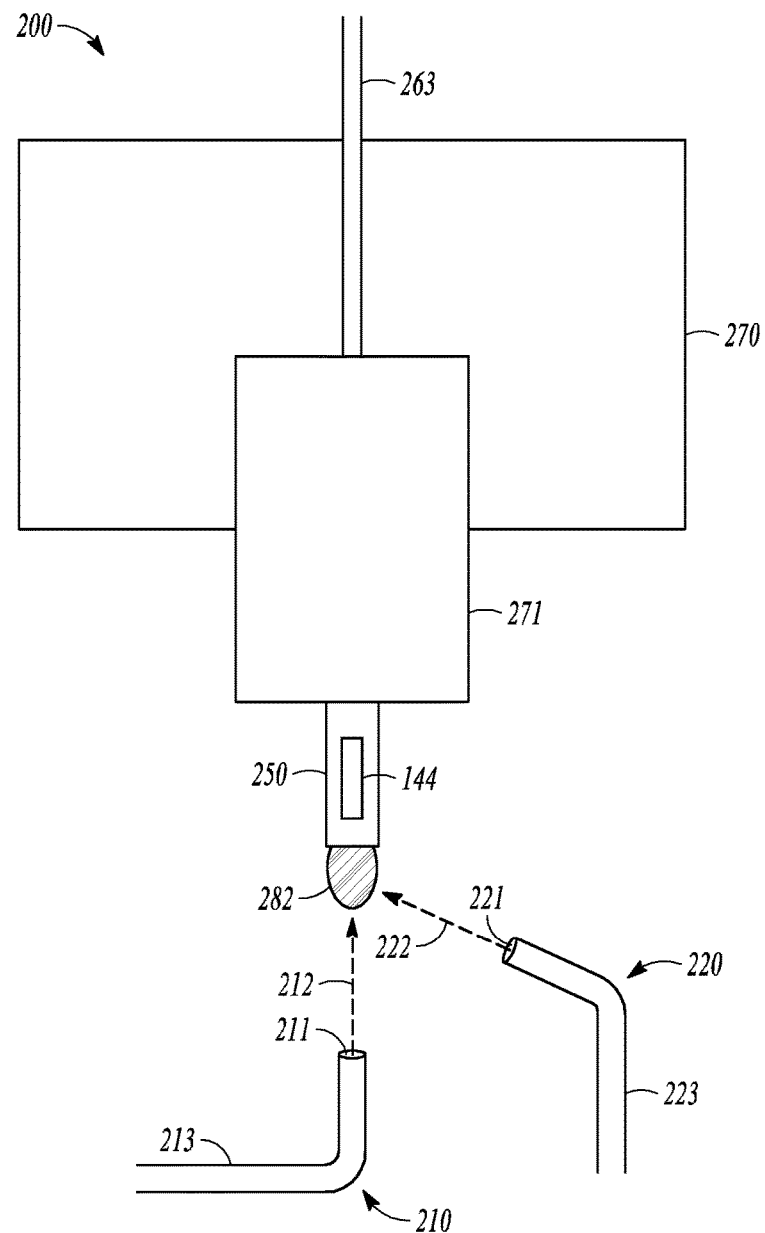
FIG. 2 illustrates generally an example of an extrusion head assembly and multiple flow regulators.

FIG. 2 illustrates generally an example 200 of a portion of an additive manufacturing system that includes a nozzle cartridge 271 and multiple flow regulators. The multiple flow regulators can be used individually or together to deliver a gas or liquid in the direction of a thermoplastic material 282 in a nozzle tip 250 of the nozzle cartridge 271. The thermoplastic material 282 can be solid material that can be liquefied for use in a build event, or the thermoplastic material 282 can be substantially liquid material to be solidified after a build event, such as for storage of a nozzle cartridge or other processing, including a material change over.

The nozzle cartridge 271 can receive a thermoplastic material from a material conduit 263. The received thermoplastic material can optionally include a thermoplastic filament, pellet, or other raw thermoplastic material in a substantially solid or liquid state. One of the nozzle cartridge 271 and the extrusion head assembly 270 can optionally include a liquefier assembly configured to heat a portion of the thermoplastic material for dispensing the thermoplastic via the nozzle tip 250.

In the example of FIG. 2, the nozzle cartridge 271 is retained in a cartridge chassis 272 of an extrusion head assembly 270. The extrusion head assembly 270 can optionally be mounted on a gantry system, robotic arm, or other mover for use in an additive manufacturing system, such as in the system 100 described above in the discussion of FIG. 1. A flow regulator can be provided to regulate a flow of the thermoplastic material from the nozzle tip 250 of the nozzle cartridge 271. The gantry system or robotic arm can be configured to move the nozzle cartridge 271, on its own or in combination with the extrusion head assembly 270, to a location near a flow regulator. The flow regulator can be stationary or can be configured to move relative to the nozzle cartridge 271.

In the example of FIG. 2, the nozzle tip 250 defines an axis that extends substantially vertically through the discharge orifice of the tip. A first flow regulator 210 includes an on-axis exit orifice 211 configured to deliver an on-axis flow 212 including a gas or liquid, from a first source manifold 213, in the direction of the thermoplastic material 282 at the nozzle tip 250. A second flow regulator 220 includes an off-axis exit orifice 221 configured to deliver an off-axis flow 222 including a gas or liquid, from a second source manifold 223, in the direction of the thermoplastic material 282 at the nozzle tip 250. The on-axis flow 212 can be delivered as shown in the example of FIG. 2, with the flow effectively parallel to parallel to the axis of the nozzle tip 250. The on-axis flow 212 thereby impinges on the thermoplastic material 282 at or in the exit orifice of the tip to influence a temperature-sensitive characteristic of the thermoplastic material 282. The off-axis flow 222 can be delivered as shown in the example of FIG. 2, with the flow approaching the nozzle tip 250 from an angle such that the flow impinges on the thermoplastic material 282 at or in the exit orifice of the tip. In an example that includes at least one of the orifices 211 and 221 configured to provide a gas, the gas can be delivered at a specified velocity, at a specified flow rate or volume, or at a specified temperature. For example, a high temperature, high velocity gas stream at a temperature of about 250 C can be used to liquefy the thermoplastic material 282 in the nozzle tip 250.

Multiple different gas types can be used, alone or in combination. For example, the first or second flow regulators 210 or 220 can provide at least one of carbon dioxide, argon, nitrogen, a fluoroalkane gas, or pressurized ambient air. In an example that includes at least one of the orifices 211 and 221 configured to provide a liquid, the liquid can optionally be delivered at a specified velocity, at a specified flow rate or volume, or at a specified temperature. Multiple different liquid types can be used, alone or in combination. For example, the first or second flow regulators 210 or 220 can provide at least one of water, glycol, glycerol, or other liquid material. In an example, a flow regulator can be configured to dispense a liquid material that becomes a gas or a vapor when the material exits the orifice of the regulator.

A flow regulator can optionally be coupled to the nozzle cartridge or to an extrusion head assembly to which a nozzle cartridge can be coupled, such that the flow regulator can move with the nozzle cartridge. To maintain clearance around the exit orifice of the nozzle tip, for releasing thermoplastic material during a build event, at least one of the nozzle cartridge or the flow regulator can be movable away from the other of the nozzle cartridge or the flow regulator. For example, a flow regulator can be moved relative to the nozzle cartridge such that the flow regulator can be moved away from the nozzle tip during a build event, and then the flow regulator can be moved into place after the build event to administer a gas or liquid in the direction of a material at the tip of the nozzle cartridge. In another example, the nozzle cartridge itself can be moved relative to the flow regulator. In this example, the nozzle cartridge can be movable between a build position for use during a build event and a moved-away or retracted position for other processing. In the retracted position, any material at the tip of the nozzle cartridge can be aligned with an exit orifice of the flow regulator to receive a gas or liquid.

Figure 3:
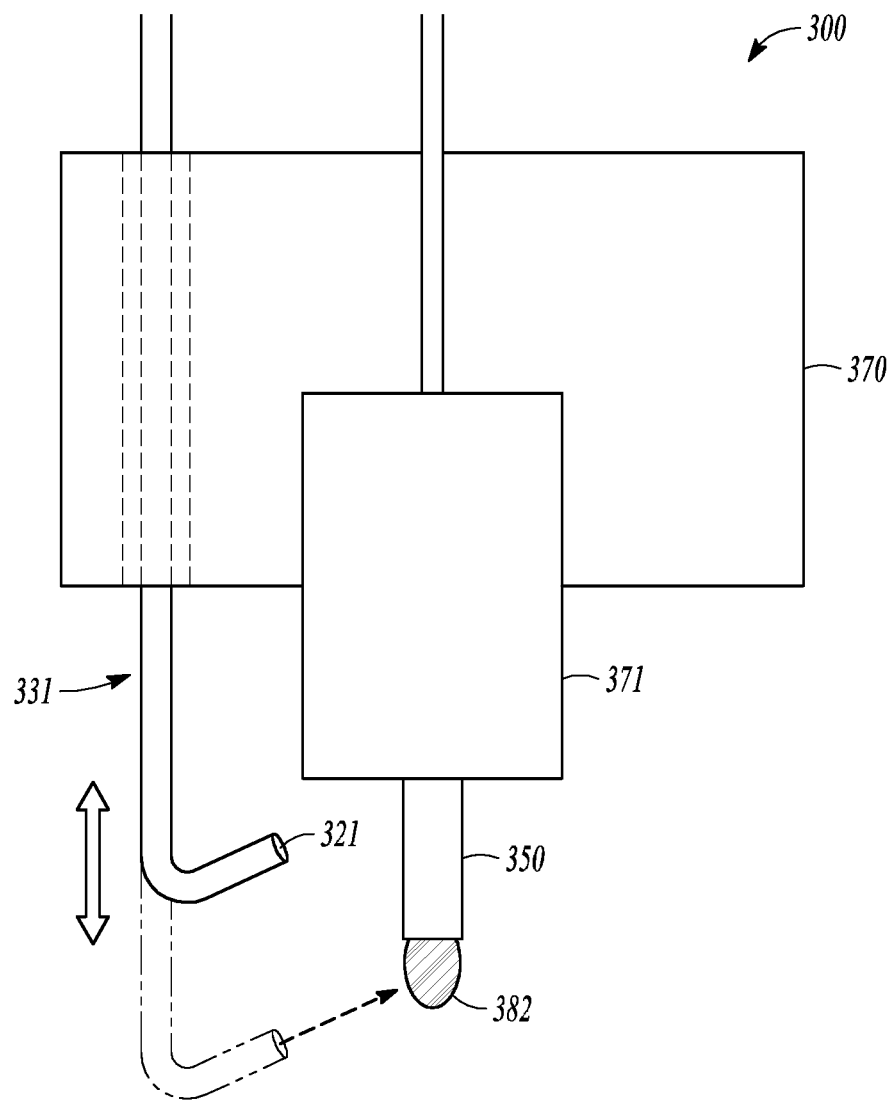
FIG. 3 illustrates generally an example of an extrusion head assembly with a movable flow regulator.

FIG. 3 illustrates generally an example 300 of a portion of an additive manufacturing system that includes a nozzle cartridge 371 coupled to an extrusion head assembly 370, and a retractable flow regulator 331. The retractable flow regulator can be used to deliver a gas or liquid in the direction of a thermoplastic material 382 in a nozzle tip 350 of the nozzle cartridge 371. The thermoplastic material 382 can be solid material to be liquefied for a build event, or the thermoplastic material 382 can be substantially liquid material to be solidified for storage of the nozzle cartridge, or for other processing, such as for a material change over.

In the example of FIG. 3, the nozzle cartridge 371 is retained in or is fixed relative to the extrusion head assembly 370. In the example of FIG. 3, the retractable flow regulator 331 is coupled to the extrusion head assembly 370. In other examples, the retractable flow regulator 331 can be coupled to the nozzle cartridge 371. The retractable flow regulator 331 can be configured to be movable in the z-direction relative to the nozzle cartridge 371 and the nozzle tip 350. For example, the retractable flow regulator 331 can be movable between a first or retracted position, as shown in solid lines in FIG. 3, and a second or extended position, as shown in dashed lines in FIG. 3. A body portion or manifold of the retractable flow regulator 331 can be moved up or down relative to the nozzle cartridge 371 such that the exit orifice 321 can be positioned to dispense a gas or liquid in the direction of the thermoplastic material 382 at the nozzle tip 350. In an example, the body portion of the flow regulator 331 includes a solid conduit, or the body portion includes a telescoping tube to facilitate movement in the z-direction.

During a build event in which the nozzle cartridge 371 deposits thermoplastic material from the nozzle tip 350, the retractable flow regulator 331 can be in the retracted position. After a portion of the build event, the extrusion head assembly 370, including the retractable flow regulator 331, can be withdrawn from the build area. Withdrawing the extrusion head assembly 370 from the build area can include lifting the assembly vertically or moving the assembly horizontally to position the nozzle cartridge 371 away from a location where thermoplastic material was deposited in the previous build event. Once the extrusion head assembly 370 is sufficiently moved away from the build area, the retractable flow regulator 331 can be extended into the extended position, and gas or liquid can be dispensed from the exit orifice 321 toward the thermoplastic material 382 at the nozzle tip 350 to change a phase or state status of the thermoplastic material 382.

Figure 4:
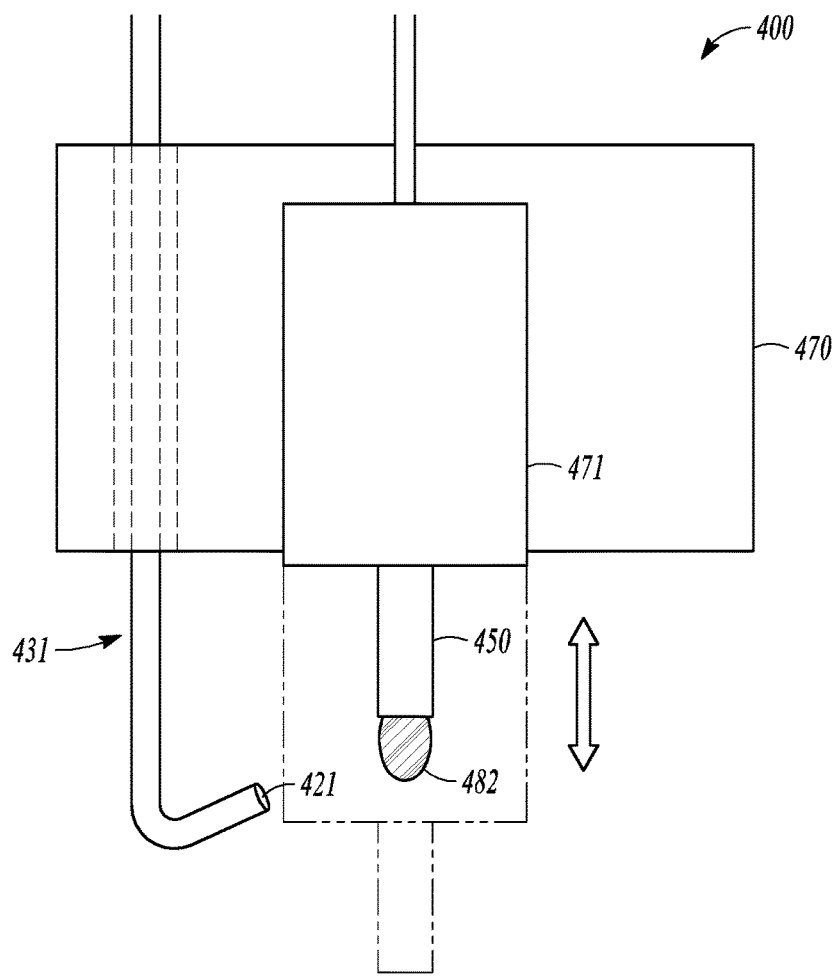
FIG. 4 illustrates generally an example of an extrusion head assembly with a fixed flow regulator.

FIG. 4 illustrates generally an example 400 of a portion of an additive manufacturing system that includes a flow regulator 431 and a movable nozzle cartridge 471. The movable nozzle cartridge 471 is shown coupled to an extrusion head assembly 470. The flow regulator 431 can be substantially fixed in position relative to the extrusion head assembly 470, and the movable nozzle cartridge 471 can be configured to move relative to an exit orifice 421 of the flow regulator 431. The flow regulator 431 can be used to deliver a gas or liquid in the direction of a thermoplastic material 482 in a nozzle tip 450 of the movable nozzle cartridge 471. The thermoplastic material 482 can be solid material to be liquefied for a build event, or the thermoplastic material 482 can be substantially liquid material to be solidified for storage of the nozzle cartridge, or for other processing, such as for a material change over.

In the example of FIG. 4, the flow regulator 431 is retained in or is fixed in position relative to the extrusion head assembly 470. The movable nozzle cartridge 471 can be coupled to the extrusion head assembly 470 and can be configured to be movable relative to the fixed flow regulator 431. For example, the movable nozzle cartridge 471 can be movable between a first or retracted position, as shown in solid lines in FIG. 4, and a second or build position, as shown in dashed lines in FIG. 4. Although the illustrated embodiment shows a nozzle cartridge that is entirely movable, only a portion of the nozzle cartridge is movable in other embodiments. For example, only a tip portion of the nozzle cartridge 471 can optionally be movable, such as relative to the flow regulator 431. The nozzle tip 450 can be extendable or retractable in the z-direction relative to the flow regulator 431 such that the exit orifice 421 can be positioned to dispense a gas or liquid in the direction of the thermoplastic material 482 at the nozzle tip 450 of the nozzle cartridge 471.

During a build event in which the nozzle cartridge 471 deposits thermoplastic material from the nozzle tip 450, the movable nozzle cartridge 471 can be in the extended position. After a portion of the build event, at least the nozzle tip 450 of the nozzle cartridge 471 can be withdrawn from the build area. Withdrawing the nozzle tip 450 from the build area can include lifting the tip vertically or moving the tip horizontally (e.g., together with the nozzle cartridge 471) to position the nozzle tip 450 away from a location where thermoplastic material was deposited in the prior build event. Once the nozzle tip 450 is sufficiently moved away from the build area, and is positioned in-line with the exit orifice 421 of the flow regulator 431, gas or liquid can be dispensed from the exit orifice 421 toward the thermoplastic material 482 at the nozzle tip 450 to change a phase or state status of the thermoplastic material 482.

Figure 5:
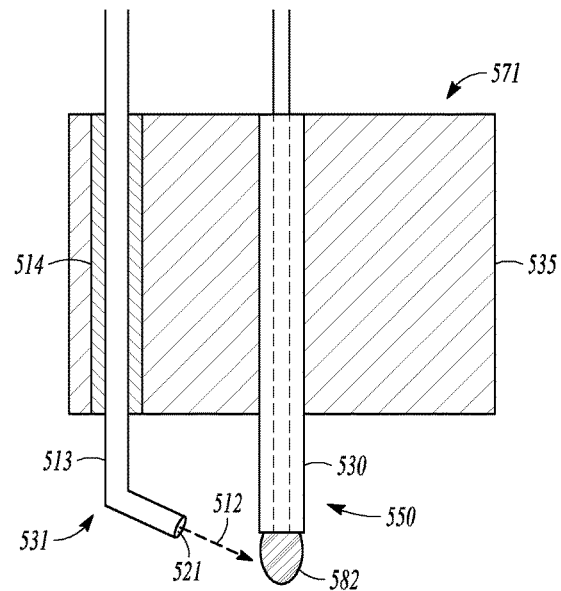
FIG. 5 illustrates generally a section view of a portion of a nozzle cartridge with an integrated flow regulator.

FIG. 5 illustrates generally a section view of a portion of a nozzle cartridge 571 and a flow regulator 531. The flow regulator 531 is positioned to direct a gas or liquid flow 512 toward a thermoplastic material 582 at a nozzle tip 550 of the nozzle cartridge 571.

In the example of FIG. 5, the flow regulator 531 is fixed in place relative to the nozzle tip 550. The flow regulator 531 and its exit orifice 521 are positioned such that the nozzle cartridge 571 can release thermoplastic material in a build event, and immediately after the build event, the exit orifice 521 can release the gas or liquid in the direction of the thermoplastic material 582 at the nozzle tip 550 such as without first moving the nozzle cartridge 571 away from the build area. The flow 512 can contact the thermoplastic material 582 when the flow 512 is released from the exit orifice 521 with sufficient force to traverse a fixed distance between the exit orifice 521 of the flow regulator 531 and the exit orifice of the nozzle tip 550.

The nozzle cartridge 571 includes a liquefier assembly 530 that is configured to liquefy the thermoplastic material 582 before the material reaches the nozzle tip 550. The nozzle cartridge 571 includes a thermal block 535 to retain or sink heat near the liquefier assembly 530.

Optionally, the flow regulator 531 includes a manifold 513 that extends through a portion of the thermal block 535 or through another portion of the nozzle cartridge 571 assembly. In an example, the manifold 513 can be insulated from the thermal block 535 using an insulator 514 positioned between the walls of the manifold 513 and the thermal block 535.

In an example, the thermal block 535 is configured to retain heat to improve efficiency of the liquefier assembly 530, and the flow regulator 531 is configured to deliver a supercooled gas in the direction of the thermoplastic material 582. In this example, the insulator 514 can help to reduce heat exchange between the thermal block 535 and the supercooled gas in the manifold 513 of the flow regulator 531.

Multiple different flow regulators can be configured for use with the nozzle cartridge 571. In the example of FIG. 5, a second flow regulator can be added opposite the flow regulator 531 such that two different flow regulators can be configured to direct gas or liquid toward the thermoplastic material 582. In an example, the two different flow regulators are configured to provide the same or different heated or cooled gas or liquid.

Figure 6:
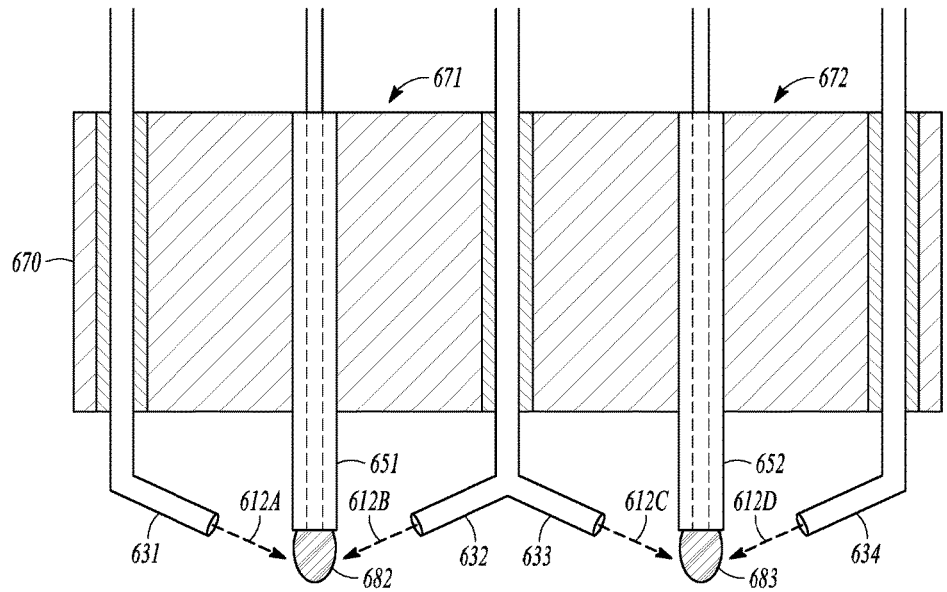
FIG. 6 illustrates generally a section view of a pair of nozzle cartridges with multiple integrated flow regulators.

FIG. 6 illustrates generally a section view of an example 600 of an extrusion head assembly 670 that includes first and second nozzle cartridges 671 and 672 and multiple flow regulators. Each of the multiple flow regulators can be configured to provide a temperature-regulating gas or liquid in the direction of a thermoplastic material in a respective one of the first and second nozzle cartridges 671 and 672.

The first nozzle cartridge 671 can include a first nozzle tip 651 and can be configured to dispense a first thermoplastic material 682. A first flow regulator 631 can be configured to provide a first gas or liquid flow 612A in the direction of the first thermoplastic material 682, as similarly described above for the flow regulator 531 and the thermoplastic material 582 in the example of FIG. 5. The example of FIG. 6 includes a second flow regulator 632 that is configured to provide a second gas or liquid flow 612B in the direction of the same first thermoplastic material 682. The first and second flow regulators 631 and 632 can be configured to provide the same or different gas or liquid material from their respective exit orifices. For example, the first flow regulator 631 can be configured to provide a coolant gas, such as to solidify the thermoplastic material 682 after a build event, and the second flow regulator 632 can be configured to provide a heated gas, such as to liquefy the thermoplastic material 682 just before a build event.

In the example of FIG. 6, the second nozzle cartridge 672 includes a second nozzle tip 652 and can be configured to dispense a second thermoplastic material 683. A third flow regulator 633 can be configured to provide a third gas or liquid flow 612C in the direction of the second thermoplastic material 683, as similarly described above for the first flow regulator 631 and the first thermoplastic material 682. A fourth flow regulator 634 can be configured to provide a fourth gas or liquid flow 612D in the direction of the same second thermoplastic material 683. The third and fourth flow regulators 633 and 634 can be configured to provide the same or different material from their respective exit orifices, and can further be configured to provide the same or different material as is provided using the first and second flow regulators 631 and 632.

In an example, the second and third flow regulators 632 and 633 can share a common manifold or source, and can provide the same gas or liquid to the first and second thermoplastic materials 682 and 683, respectively, at the first and second nozzle tips 651 and 652. Each of the multiple flow regulators in the example of FIG. 6 can include a dedicated valve that is configured to selectively release the gas or liquid in the direction of one of the first and second thermoplastic materials 682 and 683. The valves can be controlled by a processor circuit, such as the control circuit 190.

Figure 7:
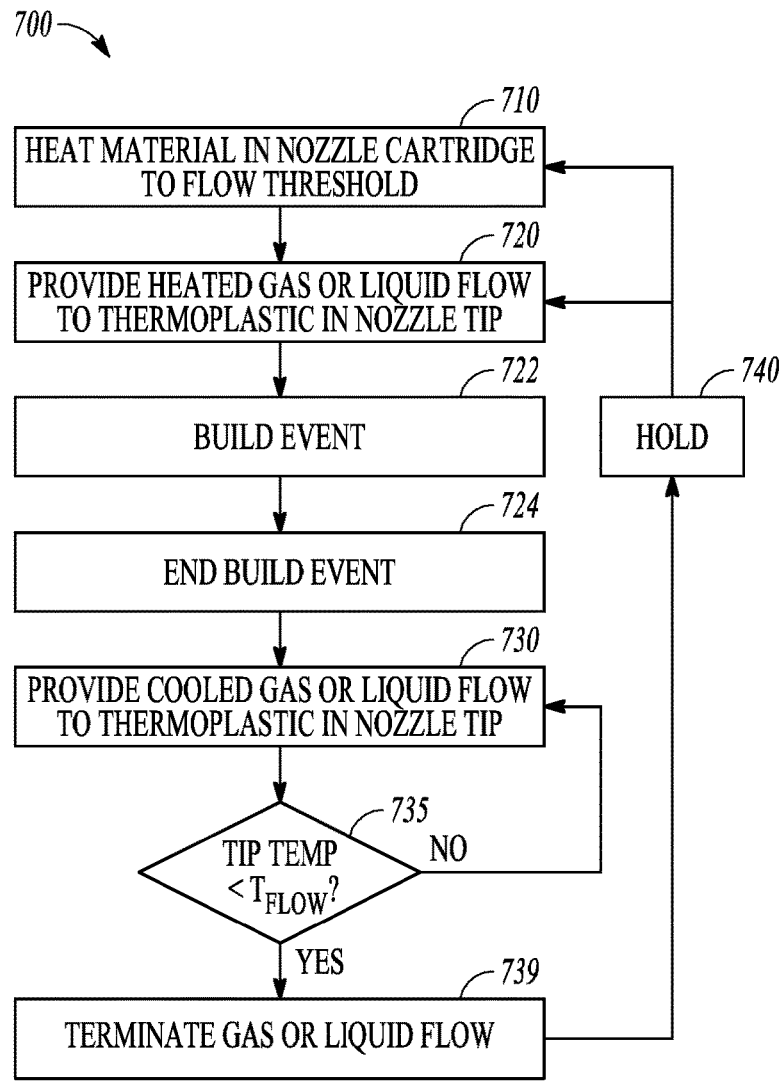
FIG. 7 illustrates generally an example of a method that includes using a flow regulator to change a phase of a thermoplastic material in a nozzle cartridge extrusion tip.
Figure 8:
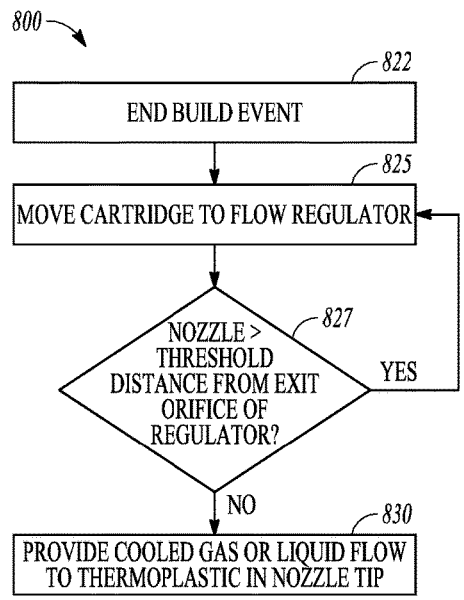
FIG. 8 illustrates generally an example of a method that includes determining a nozzle cartridge location relative to a flow regulator.
Figure 9:
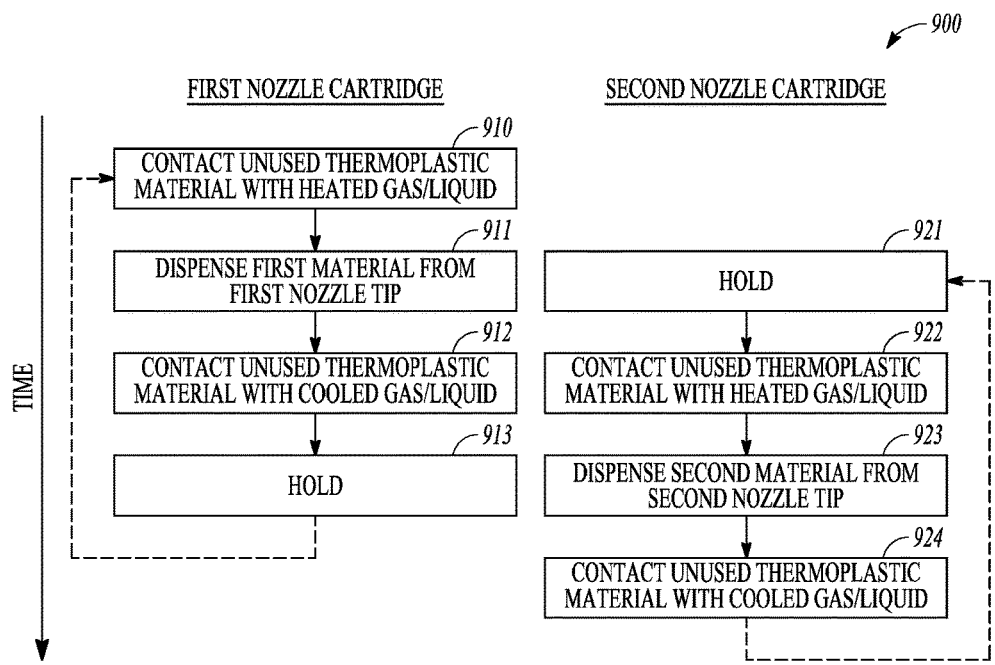
FIG. 9 illustrates generally an example of a method that includes using first and second flow regulators that correspond respectively to first and second nozzle cartridges.

The non-limiting systems described in FIGS. 1-6, and variations and permutations thereof, can include one or more flow regulators that can be used to alter a material characteristic of a thermoplastic at a tip of a nozzle cartridge, such as before or after the nozzle cartridge is used in a build event. FIGS. 7-9 illustrate generally several examples of methods that can include using a flow regulator to alter a flow status of a thermoplastic.

FIG. 7 illustrates generally an example 700 that can include using a flow regulator to change a phase of a thermoplastic material at an exit orifice of a material extrusion nozzle tip. The additive manufacturing systems in the examples of FIGS. 1-6 can optionally be used to perform all or a portion of the example 700. At 710, the example 700 includes heating a thermoplastic material in a reservoir of a nozzle cartridge to greater than a flow threshold temperature of the material such that the heated material can be dispensed or extruded from a nozzle tip of the cartridge. The thermoplastic material can be heated at 710 using a liquefier assembly positioned near the nozzle tip of the nozzle cartridge. In an example, the liquefier assembly is spaced apart from the nozzle tip. Before liquid thermoplastic material can be released from the nozzle cartridge, the thermoplastic material and the nozzle cartridge flow channel must be sufficiently heated such that the thermoplastic can flow through the channel and out of the nozzle tip. As a result, there can be a delay between a start of the heating at 710 (e.g., at the liquefier assembly) and a release of the thermoplastic material from the nozzle tip, for example, because the nozzle tip region of the cartridge can sink heat out of or away from the thermoplastic material. Once the nozzle tip region is at or above the flow threshold temperature of the thermoplastic material, the material can be released from the cartridge.

To help to address the delay problem, a flow regulator can be provided to deliver a heated gas or liquid at the nozzle tip. More particularly, in some examples, the flow regulator can be configured to deliver the heated gas or liquid to an exit orifice of the nozzle tip such that the heated gas or liquid contacts any thermoplastic material inside the tip.

At 720, the example 700 optionally includes providing a heated gas or liquid in the direction of an exit orifice of the nozzle tip to contact any thermoplastic material at the nozzle tip or to contact generally the nozzle tip area of the nozzle cartridge. The heated gas or liquid can heat the nozzle tip or the thermoplastic material at the nozzle tip to a temperature that is at or above a flow threshold temperature of the material. By providing the heated gas or liquid at 720, such as in combination with heating the thermoplastic material in the nozzle cartridge at 710 using the liquefier assembly, the nozzle cartridge can quickly respond to instructions from a controller (e.g., the control circuit 190) to begin a build event.

In an example, the heating at 710 includes pre-heating material in a thermoplastic reservoir in a nozzle cartridge or in a flow channel of the nozzle cartridge such that material at or near the nozzle tip is maintained just below a flow threshold temperature of the thermoplastic material. When the heated gas or liquid is provided at 720, such as in response to a build instruction from the control circuit 190, the thermoplastic material at the nozzle tip can be heated and released from the tip.

At 722, the example 700 includes performing a build event using the nozzle cartridge that was heated at 710 and 720. Performing the build event at 722 can include initiating a drive assembly in the nozzle cartridge or in the extrusion head assembly to drive thermoplastic material through the liquefier assembly, out of the nozzle tip, and onto a build platform or a portion of a part composite in a build area of an additive manufacturing system.

At 724, the example 700 includes ending the build event, such as by stopping the drive assembly in response to instructions from the control circuit 190. Ending the build event at 724 can include withdrawing the nozzle cartridge or the nozzle tip from the build area of the system. For example, a robotic arm or a gantry system can optionally be used to relocate the nozzle cartridge from the build area to a holding area or some other processing area in the system. In an example, the nozzle cartridge can be retracted vertically away from the build area, such as corresponding to the example of FIG. 4, described above.

At 730, the example 700 includes providing a cooled gas or liquid in the direction of the exit orifice of the nozzle tip, using a flow regulator, to contact any unused thermoplastic material at the nozzle tip, or to contact generally the nozzle tip area of the nozzle cartridge. The cooled gas or liquid can reduce the temperature at the nozzle tip to a temperature that is at or below the flow threshold temperature of the thermoplastic material that was deposited during the build event at 722. Providing the cooled gas or liquid at 730 can be performed in coordination with deactivating the liquefier assembly or the drive assembly associated with the nozzle cartridge. By providing the cooled gas or liquid at 730, the nozzle cartridge can respond more quickly to instructions from a controller (e.g., the control circuit 190) to stop or end a portion of a build event, such as by cooling the thermoplastic material at the exit orifice of the nozzle cartridge, thereby inhibiting any further unwanted flow of material from the cartridge, such as while excess heat from the liquefier assembly is dissipated elsewhere. In an example, periodic bursts of cooled gas or liquid can be delivered to the nozzle tip to maintain the thermoplastic material is a substantially solid or non-flowing state, such as while the rest of the nozzle cartridge assembly cools.

At 735, the example 700 includes measuring a temperature of the nozzle cartridge to identify when to stop providing the cooled gas or liquid. Measuring the temperature of the nozzle cartridge can include using a temperature sensor on-board the nozzle cartridge (see, e.g., the integrated temperature sensor 144 in the example of FIG. 2) or using a temperature sensor external to the nozzle cartridge (see, e.g., the non-contact temperature sensor 145 in the example of FIG. 1). If the measured temperature is less than the flow threshold temperature (or some other specified temperature, such as can be calibrated manually or automatically), then the cooled gas flow can be terminated at 739.

If the measured temperature is greater than or equal to the flow threshold (or the other specified temperature), then the cooled gas or liquid flow can continue at 730. In an example, continuing the cooled gas or liquid flow can include adjusting one or more characteristics of the cooled gas or liquid flow. For example, one or more of the gas or liquid type, temperature, volume, or velocity can be changed.

The example 700 can repeat when a subsequent build instruction is received, such as from the control circuit 190. For example, after the gas or liquid flow is terminated at 739, the system can remain in a hold 740. Upon receipt of subsequent build instructions from the control circuit 190, the same nozzle cartridge or a different nozzle cartridge can be used in a different build event. In response, the example can proceed at 710 by heating the material in the nozzle cartridge, such as using the liquefier assembly.

In an example that includes re-using a nozzle cartridge that was recently used, such as when only a small amount of time has elapsed since the previous build event, the example can begin again at 720, such as instead of at 710. In this example, the flow regulator can be used to initiate the material flow for the subsequent build event. For example, when material in the nozzle cartridge reservoir is maintained at or sufficiently near the flow threshold temperature, the liquefier assembly may not need to preheat the material at 710 before the subsequent build event begins, and the heated gas or liquid provided at 720 can enable a sufficient amount of material to flow from the nozzle tip until the liquefier assembly or reservoir is brought to a sufficient temperature to supply additional material.

FIG. 8 illustrates generally an example 800 that includes moving a nozzle cartridge to a flow regulator. At 822, the example 800 includes ending a build event, such as described above in the example of FIG. 7 at 722. At 825, the example 800 includes moving a nozzle cartridge to a flow regulator. Moving the nozzle cartridge can include using a gantry system, robotic arm, or other mover to relocate the nozzle cartridge to a position near a flow regulator. In an example, moving the nozzle cartridge includes moving an extrusion head assembly to which the nozzle cartridge is attached.

At 827, the example 800 includes determining whether the moved nozzle cartridge is within a specified threshold distance of an exit orifice of the flow regulator. The flow regulator can be activated or turned on, such as to begin a gas or liquid release, only when the nozzle cartridge is determined to be within the threshold distance. In an example, determining the position of the nozzle cartridge can be performed using an optical sensor, or using a physical trigger or switch, or using an electronic sensor, such as can be configured to monitor or receive information about a position of a robotic arm or gantry system, and thereby provide information about a location of the nozzle cartridge to the control circuit 190. If, at 827, the nozzle cartridge is not within the threshold distance, then the nozzle cartridge can be further moved into the proper position. If, at 827, the nozzle cartridge is within the threshold distance, then the example 800 can continue at 830.

At 830, the example 800 includes providing a cooled gas or liquid in the direction of the exit orifice of the nozzle tip, using a flow regulator, to contact any unused thermoplastic material at the nozzle tip, or to contact generally the nozzle tip area of the nozzle cartridge. The cooled gas or liquid can reduce the temperature at the nozzle tip to a temperature that is at or below the flow threshold temperature of the thermoplastic material that was deposited during the preceding build event (e.g., the build event that ended at 822 in the example of FIG. 8). Providing the cooled gas or liquid at 830 can include in coordination with deactivating a liquefier assembly or stopping a drive assembly associated with the nozzle cartridge.

FIG. 9 illustrates generally an example 900 that includes using multiple flow regulators corresponding to multiple nozzle cartridges in a single additive manufacturing system. The multiple nozzle cartridges can be configured to dispense the same or different materials (e.g., the first nozzle cartridge dispenses model material and the second nozzle cartridge dispenses support material) to create the same part composite. The example 900 is arranged in first and second columns along a vertical time axis. The first or left side column corresponds to events associated with a first nozzle cartridge, and the second or right side column corresponds to events associated with a second nozzle cartridge.

At 910, the example 900 includes releasing a heated gas from a first flow regulator to contact unused first thermoplastic material in a first nozzle tip of the first nozzle cartridge. Releasing the heated gas at 910 can correspond to the example of FIG. 7 at 720. At 911, the example 900 includes dispensing the first thermoplastic material from the first nozzle tip. Dispensing the material at 911 includes building a first portion of a part composite, such as using one of model or support material.

At 921, corresponding temporally to 911 as indicated in FIG. 9, a second nozzle cartridge can be in a holding state. During a hold, a nozzle cartridge can be dormant, waiting for a build instruction, or one or more non-build-event-related processes can be performed on or using the held nozzle cartridge. For example, during a hold, a nozzle cartridge change can be performed, a material change can be performed, a nozzle tip change can be performed, or a material can be purged from a nozzle cartridge, among other things.

At 912, the first build event can end and the first flow regulator can be used to dispense a cooled gas or cooled liquid in the direction of the first nozzle tip of the first nozzle cartridge. The dispensed cooled gas or liquid can contact any unused thermoplastic material in the nozzle cartridge to arrest a flow of any unused thermoplastic material from the tip.

At 922, corresponding temporally to 912, the example 900 includes releasing a heated gas from a second flow regulator to contact unused second thermoplastic material in the second nozzle tip. The heated gas release at 922 can be performed in the same manner as at 910, except that the heated gas is released toward the nozzle tip of the second nozzle cartridge at 922 and the heated gas is released toward the nozzle tip of the first nozzle cartridge at 910.

At 923, the example 900 includes dispensing the second thermoplastic material from the second nozzle tip in a second build event. In an example, the second build event includes building a subsequent portion of the same part composite that was built during the previous build event at 911. In an example, dispensing the material at 923 includes using the second nozzle cartridge to dispense a model material. At 913, such as corresponding temporally to 923, the first nozzle cartridge can enter a holding state, such as described above for the second nozzle cartridge at 921.

At 924, the second build event can end and the second flow regulator can be used to dispense a cooled gas or cooled liquid in the direction of the second nozzle tip of the second nozzle cartridge, such as to contact any unused thermoplastic material in the nozzle cartridge and to arrest the flow of the unused thermoplastic material from the tip. In an example, the example 900 continues by returning the first nozzle cartridge to 910, such as temporally coincident with 924.

That is, while one nozzle cartridge receives a heated gas or liquid, the other nozzle cartridge can receive a cooled gas or liquid.

Polymeric materials that can be used according to the systems, devices, and methods described herein can include high-performance engineering thermoplastic polymers such as polycarbonate-based polymers (PC), polymethyl methacrylate polymers (PMMA), polyethylene terephthalate polymers (PET), polybutylene terephthalate polymers (PBT), styrene polymers, polyetherimide (PEI, Ultem), acrylic-styrene-acrylonitrile polymers (ASA), and acrylonitrile-butadiene-styrene polymers (ABS). Engineering thermoplastic polymers can be used because they have a relatively high flexural modulus.

In a specific embodiment, the polycarbonate can be a linear homopolymer containing bisphenol A carbonate units (BPA-PC); a branched, cyanophenyl end-capped bisphenol A homopolycarbonate produced via interfacial polymerization, containing 3 mol % 1,1,1-tris(4-hydroxyphenyl)ethane (THPE) branching agent, commercially available under the trade name LEXAN CFR from the Innovative Plastics division of SABIC; a poly(carbonate-siloxane) comprising bisphenol A carbonate units and siloxane units, for example blocks containing 5 to 200 dimethylsiloxane units, such as those commercially available under the trade name LEXAN EXL from the Innovative Plastics division of SABIC. Other specific polycarbonates that can be used include poly(estercarbonate)s comprising bisphenol A carbonate units and isophthalate-terephthalate-bisphenol A ester units, also commonly referred to as poly(carbonate-ester)s (PCE) poly (phthalate-carbonate)s (PPC) depending on the relative ratio of carbonate units and ester units. Poly(aliphatic estercarbonate)s can be used, such as those comprising bisphenol A carbonate units and sebacic acid-bisphenol A ester units, such as those commercially available under the trade name LEXAN HFD from the Innovative Plastics division of SABIC. Other specific copolycarbonate includes bisphenol A and bulky bisphenol carbonate units, i.e., derived from bisphenols containing at least 12 carbon atoms, for example 12 to 60 carbon atoms or 20 to 40 carbon atoms. Examples of such copolycarbonates include copolycarbonates comprising bisphenol A carbonate units and 2-phenyl-3,3'-bis(4-hydroxyphenyl) phthalimidine carbonate units (a BPA-PP-PBP copolymer) (commercially available under the trade name LEXAN XHT from the Innovative Plastics division of SABIC), a copolymer comprising bisphenol A carbonate units and 1,1-bis(4-hydroxy-3-methylphenyl)cyclohexane carbonate units (a BPA-DMBPC copolymer), and a copolymer comprising bisphenol A carbonate units and isophorone bisphenol carbonate units (available, for example, under the trade name APEC from Bayer).

Polycarbonates and poly(ester-carbonate)s can be manufactured by processes such as interfacial polymerization and melt polymerization.

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute.

In addition to the polycarbonate as described above, the polycarbonate compositions can comprise a cycloaliphatic polyester of formula (5),

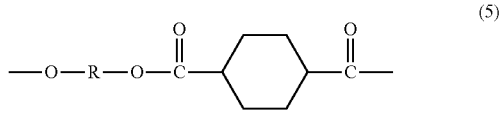

(5)

wherein R is a C2-12 alkylene or a C3-12 cycloalkylene, specifically a C2-6 alkylene or a C5-6 cycloalkylene. In a specific embodiment, the cycloaliphatic polyester is a poly (1,4-cyclohexanedimethanol-1,4-cyclohexanedicarboxylate) (PCCD) having recurring units of formula (6).

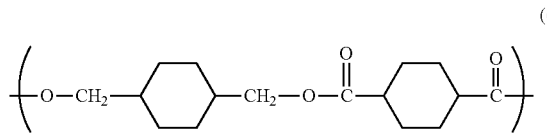

(6)

The 1,4-cyclohexanedimethylene group can be derived from 1,4-cyclohexanedimethanol (which includes chemical equivalents thereof), and cyclohexanedicarboxylate (which includes a chemical equivalent thereof. The polyester can comprise the cis-isomer, the trans-isomer, or a combination comprising at least one of the foregoing isomers.

The cycloaliphatic polyester can have an intrinsic viscosity, as determined in chloroform at 25 C, of 0.3 to 1.5 deciliters per gram (dl/gm), specifically 0.45 to 1.0 dl/gm. The polycarbonates can have a weight average molecular weight of 10,000 to 200,000 Daltons, specifically 30,000 to 100,000 Daltons, as measured by gel permeation chromatography (GPC), using a crosslinked styrene-divinylbenzene column.

The polycarbonate and polyester can be used in a weight ratio of 10:1 to 1:10, 10:1 to 1:8, 10:1 to 1:5, 10:1 to 1:1 or 9:1 to 1:1, depending on the function and properties desired. In an embodiment, the composition comprises 5 wt. % to 95 wt. %, 20 wt. % to 95 wt %, 40 wt. % to 95 wt. %, 50 wt. % to 95 wt. %, or 50 wt. % to 90 wt. % of the polycarbonate and 5 wt. % to 95 wt. %, 5 wt. % to 80 wt. %, 5 wt. % to 60 wt. %, 5 wt. % to 50 wt. %, or 10 wt. % to 50 wt. % of the polyester, based on the total weight of the composition.

Dyes can be applied to the polymeric material to provide for a desired color or color-enhancing effect to the polymeric material. In some examples, photochromic dyes can be widely used in commercial applications in plastics, films, coatings, and inks to provide color-enhancing effects or to function as an ultraviolet (UV) indicator. A dye can be incorporated into the bulk of the polymeric material. Dyes can also be used as a surface coating on the polymeric material, for example on a lens in photochromic lens applications. Wen et al., in Provisional U.S. Patent Application No. 61/931,033, filed on Jan. 24, 2014, includes systems and methods for using photochromic dyes in engineering plastics.

A variety of different photochromic dyes can be used. The photochromic dyes can have at least one activated absorption maxima within the range between about 380 nm and 750 nm, and are thermally and chemically stable. Exemplary photochromic dyes include benzopyrans; napthopyrans; spironapthopyrans; spironaphthoxazines; spiro(indolino)naphthoxazines; spiro(benzindolino)naphthoxazines; spiro(indolino)pyridobenzoxazines; spiro(benzindolino)pyridobenzoxazines; spiro(benzindolino)naphthopyrans; spiro(indolino)benzoxazines; spiro(indolino)benzopyrans; spiro(indolino)naphthopyrans; spiro(indolino)quinopyrans; organo-metal dithiazonates, for example (arylazo)thioformic arylhydrazidates; diarylethenes; fulgides and fulgimides, for example 3-furyl, 3-thienyl, and 3-pyrryl fulgides and fulgimides; and spirodihydroindolizines. Combinations comprising at least one photochromic dye can be used. Specific examples of dyes are available under the trade name Reversacol, manufactured by Vivimed Labs Europe Ltd. Useful colors include Oxford Blue, Aqua Green, Sea Green, Berry Red, Flame Red, Rose Red, Plum Red, Palatinate Purple, Storm Purple, Rush Yellow and Corn Yellow.

The organic photochromic dyes can be used either alone or in combination with one or more other photochromic compounds, for example rare earth-doped metal oxide nanoparticles (e.g. zirconium oxide, yttrium oxide, zinc oxide, copper oxide, lanthanum oxide, gadolinium oxide, praseodymium oxide, and the like, and combinations thereof that are doped with rare earths such as lanthanum, cerium, praseodymium, neodymium, samarium, europium, gadolinium, terbium, dysprosium, holmium, erbium, thulium, and the like, and combinations thereof), metal nanoparticles (e.g., gold, silver, platinum, palladium, iridium, rhenium, mercury, ruthenium, osmium, copper, nickel, and the like, and combinations thereof), semiconductor nanoparticles for example, Group II-VI semiconductors (for example, ZnS, ZnSe, ZnTe, CdS, CdSe, CdTe, HgS, HgSe, HgTe, MgTe, and the like), Group III-V semiconductors (for example, GaN, GaP, GaAs, GaSb, InN, InP, InAs, InSb, AlAs, AlP, AlSb, AlS, and the like), Group IV semiconductors (for example, Ge, Si, and the like), Group I-VII semiconductors (for example, CuCl, AgI, and the like), alloys thereof, and mixtures thereof (for example, ternary and quaternary mixtures)), and combinations thereof.

The dyes can be used in the photochromic polycarbonate compositions in any amount that is useful for dying the polycarbonate polymer, for example 10 to 1,000 parts per million by weight based on the parts by weight of the combination of the polycarbonate and the cycloaliphatic polyester. These weight percent values are per dye, i.e., a composition having multiple dyes could contain each dye independently at these concentration ranges.

An additive composition can be used in the photochromic polycarbonate compositions. The additive composition can comprise one or more additives selected to achieve a desired property, with the proviso that the additive(s) are also selected so as to not overly significantly adversely affect a desired property of the composition, in particular the photochromic properties. The additive composition or individual additives can be mixed at a suitable time during the mixing of the components for forming the composition. The additive can be soluble or non-soluble in polycarbonate.

The additive composition can include an impact modifier, flow modifier, antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, flame retardant, anti-drip agent (e.g., a PTFE-encapsulated styrene-acrylonitrile copolymer (TSAN)), or a combination comprising one or more of the foregoing. For example, a combination of an antioxidant, heat stabilizer, mold release agent, and ultraviolet light stabilizer can be used. In general, the additives are used in the amounts generally known to be effective. For example, the total amount of the additive composition (other than any impact modifier, filler, or reinforcing agent) can be 0.001 to 10.0 wt. %, or 0.01 to 5 wt. %, 0.01 to 0.2 wt. %, each based on the total weight of the polymer in the composition.

In certain embodiments, the photochromic polycarbonate compositions can comprise phosphoric acid. Without wishing to be bound by theory, it is believed that the polycarbonate may react with the cycloaliphatic polyester through transesterification causing the degradation of the polymers and the presence of phosphoric acid can effectively prevent this transesterification thus stabilizing the photochromic polycarbonate compositions. The amount of phosphoric acid added to the photochromic polycarbonate compositions can be, for example, 0.001 to 0.5 wt %, specifically 0.01 to 0.1 wt % based on the total weight of the composition.

Methods for forming the photochromic polycarbonate compositions can vary, but in an advantageous feature, include the photochromic dye in the bulk polymer composition. In an embodiment, the polymers can be combined (e.g., blended) with any additives (e.g., a mold release agent) such as in a screw-type extruder. The polymers, dye, and any additives can be combined in any order, and in form, for example, powder, granular, filamentous, as a masterbatch, and the like. Transparent compositions can be produced by manipulation of the process used to manufacture the photochromic polycarbonate composition. One example of such a process to produce transparent photochromic polycarbonate compositions is described in U.S. Pat. No. 7,767,738.

The photochromic polycarbonate compositions can have good melt viscosities, which aid processing. The photochromic polycarbonate compositions can have a melt volume flow rate (MVR, cubic centimeter per 10 minutes (cc/10 min)), of 4 to 30, greater than or equal to 12, greater than or equal to 10, greater than or equal to 15, greater than or equal to 16, greater than or equal to 17, greater than or equal to 18, greater than or equal to 19, or greater than or equal to 20 cc/min, measured at 300° C./1.2 Kg at 360 second dwell according to ISO 1133. The same or similar values can be obtained in articles having a wide range of thicknesses, for example from 0.1 to 10 mm, or 0.5 to 5 mm.

The photochromic polycarbonate compositions can have excellent impact properties, in particular multiaxial impact (MAI) and ductility, which provides information on how the compositions behave under multiaxial deformation conditions. The deformation applied can be a high-speed puncture. Properties reported include total energy absorbed, which is expressed in Joules (J) and ductility of parts in percent (% D) based on whether the part fractured in a brittle or ductile manner. A ductile part shows yielding where it is penetrated by the tip, a brittle part splits into pieces or has a section punched out that shows no yielding. The photochromic polycarbonate compositions can have an MAI equal to or higher than 100 J, determined at 23° C. at an impact speed of 4.4 m/second in accordance with ISO 6603 on discs with a thickness of 3.2 mm. The compositions can have a ductility in multiaxial impact of 80% and higher, determined at 23° C. at an impact speed of 4.4 m/second in accordance with ISO 6603 on discs with a thickness of 3.2 mm. The same or similar values can be obtained in articles having a wide range of thicknesses, for example from 0.1 to 10 mm, but particularly at 0.5 to 5 mm.

The photochromic polycarbonate compositions can have excellent impact strength. For example, an article molded from the photochromic polycarbonate compositions can have a notched Izod impact of greater than 10 kJ/m2 as measured according to ISO 180/1A at 23° C., 5.5 J, on impact bars with a 4 mm thickness. The same or similar values can be obtained in articles having a wide range of thicknesses, for example from 0.1 to 10 mm, but particularly at 0.5 to 5 mm.

The photochromic polycarbonate compositions can be formulated to have a haze less than 3%, or less than 2%, and a transmission greater than 80%, each measured using the color space CIE1931 (Illuminant C and a 2° observer) or according to ASTM D 1003 (2007) using illuminant C at a 0.062 inch (1.5 mm) thickness. In some embodiments, the photochromic polycarbonate compositions can be formulated such that an article molded from the composition has both a haze less of than 3% and a transmission of greater than 80%, each measured using the color space CIE1931 (Illuminant C and a 2° observer) or according to ASTM D 1003 (2007) using illuminant C at a 0.062 inch (1.5 mm) thickness. In some embodiments the articles can have all three of a haze less of than 3%, a transmission of greater than 85%, and an MAI equal to or higher than 100 J, determined at 23° C. at an impact speed of 4.4 m/second in accordance with ISO 6603 on discs with a thickness of 1.5 mm.

The photochromic polycarbonate compositions can have a flexural modulus of less than 3,000 MPa, less than 2,500 MPa, or less than 2,200 MPa measured according to ASTM D790 (2010) with the speed of 1.27 mm/min. The photochromic polycarbonate compositions can further have a delta a* value of 0.1 to 10 measured on Color Eye 7000A according to ASTM 6290-98.

Various Notes & Examples

Example 1 can include or use subject matter (such as an apparatus, a method, a means for performing acts, or a device readable medium including instructions that, when performed by the device, can cause the device to perform acts), such as can include or use a material flow regulator apparatus for regulating a material flow from a nozzle cartridge, such as a nozzle cartridge for use with an additive manufacturing system. The apparatus of Example 1 can include a first gas outlet positioned in or adjacent to a build area of the additive manufacturing system, and the first gas outlet can be configured to selectively release a coolant gas. Example 1 can further include a positioning device configured to position an extrusion tip region of the nozzle cartridge at the first gas outlet such that the selectively-released coolant gas from the first gas outlet contacts a portion of the extrusion tip region of the nozzle cartridge.

Example 2 can include, or can optionally be combined with the subject matter of Example 1, to optionally include the positioning device configured to position the extrusion tip region of the nozzle cartridge such that the selectively-released coolant gas from the first gas outlet contacts a thermoplastic material in an extrusion tip of the nozzle cartridge.

Example 3 can include, or can optionally be combined with the subject matter of one or any combination of Examples 1 or 2 to optionally include the selectively-released coolant gas from the first gas outlet having a temperature that is less than a flow threshold temperature of a thermoplastic material in an extrusion tip of the nozzle cartridge.

Example 4 can include, or can optionally be combined with the subject matter of Example 3, to optionally include the selectively-released coolant gas from the first gas outlet has a temperature that is at least 30° C. less than the flow threshold temperature of the thermoplastic material in the extrusion tip of the nozzle cartridge when the gas contacts the portion of the extrusion tip region of the nozzle cartridge.

Example 5 can include, or can optionally be combined with the subject matter of one or any combination of Examples 1 through 4 to optionally include the selectively-released coolant gas from the first gas outlet includes at least one of carbon dioxide, argon, nitrogen, a fluoroalkane gas, or pressurized ambient air.

Example 6 can include, or can optionally be combined with the subject matter of one or any combination of Examples 1 through 5 to optionally include the first gas outlet further configured to release a heating gas having a temperature that is greater than a flow threshold temperature of a thermoplastic material in an extrusion tip of the nozzle cartridge.

Example 7 can include, or can optionally be combined with the subject matter of Example 6, to optionally include the selectively-released heating gas from the first gas outlet has a temperature that is at least 30° C. greater than the flow threshold temperature of the thermoplastic material in the extrusion tip of the nozzle cartridge when the heating gas contacts the portion of the extrusion tip region of the nozzle cartridge.

Example 8 can include, or can optionally be combined with the subject matter of one or any combination of Examples 1 through 7 to optionally include the first gas outlet is stationary relative to a movable extrusion tip of the nozzle cartridge.

Example 9 can include, or can optionally be combined with the subject matter of Example 8, to optionally include a second gas outlet positioned in or adjacent to the build area of the additive manufacturing system, and the second gas outlet is selectively controlled by a processor circuit to release the same or different coolant gas from the first gas outlet.

Example 10 can include, or can optionally be combined with the subject matter of one or any combination of Examples 1 through 9 to optionally include a temperature sensor configured to sense a temperature of an extrusion tip of the nozzle cartridge. In Example 10, the gas outlet can be configured to release the coolant gas or inhibit the release of the coolant gas based on the temperature of the extrusion tip sensed by the temperature sensor.

Example 11 can include, or can optionally be combined with the subject matter of Example 10, to optionally include the temperature sensor configured to sense the temperature of the extrusion tip of the nozzle cartridge when the extrusion tip of the nozzle cartridge is positioned at the gas outlet.

Example 12 can include, or can optionally be combined with the subject matter of one or any combination of Examples 1 through 11 to optionally include a proximity trigger circuit configured to initiate release of the coolant gas from the gas outlet when an extrusion tip of the nozzle cartridge is within a specified first distance from the gas outlet, and further configured to inhibit release of the coolant gas from the gas outlet when the distance between the extrusion tip and the gas outlet is greater than a specified second distance from the gas outlet.

Example 13 can include, or can optionally be combined with the subject matter of one or any combination of Examples 1 through 12 to optionally include a thermoplastic material drive assembly configured to receive a filament thermoplastic material and to drive the filament thermoplastic material through a liquefier assembly and toward the extrusion tip of the nozzle cartridge, and a trigger circuit configured to initiate release of the coolant gas from the gas outlet when the thermoplastic material drive assembly stops driving the filament thermoplastic material through the liquefier assembly.

Example 14 can include, or can optionally be combined with the subject matter of one or any combination of Examples 1 through 13 to optionally include a timer circuit configured to measure a duration of release of the coolant gas from the gas outlet, and to inhibit the release of the coolant gas when the release duration exceeds a specified duration.

Example 15 can include, or can optionally be combined with the subject matter of one or any combination of Examples 1 through 14 to optionally include, as the positioning device, a robotic arm configured to move an extrusion tip of the nozzle cartridge between a build area of the additive manufacturing system and an area of the additive manufacturing system that includes the gas outlet.

Example 16 can include, or can optionally be combined with the subject matter of one or any combination of Examples 1 through 15 to optionally include, as the positioning device, a gantry system configured to move an extrusion tip of the nozzle cartridge between a build area of the additive manufacturing system and an area of the additive manufacturing system that includes the gas outlet.

Example 17 can include or use subject matter (such as an apparatus, a method, a means for performing acts, or a device readable medium including instructions that, when performed by the device, can cause the device to perform acts), such as can include or use a material flow regulator apparatus for use with an additive manufacturing system. The material flow regulator apparatus includes a nozzle cartridge including an extrusion tip, and the extrusion tip is configured to deposit a thermoplastic material when the thermoplastic material is heated to at least a flow threshold temperature of the thermoplastic material. The material flow regulator includes a coolant source configured to supply a coolant gas via a coolant outlet, and the coolant gas has a temperature that is lower than the flow threshold temperature of the thermoplastic material. In Example 17, the coolant outlet is configured to direct the coolant gas from the coolant source to contact the thermoplastic material at the extrusion tip of the nozzle cartridge.

Example 18 can include, or can optionally be combined with the subject matter of Example 17, to optionally include an extrusion head assembly that is movable in a build area of the additive manufacturing system. In Example 18, the nozzle cartridge can be coupled to the extrusion head assembly, and the extrusion head assembly can include the coolant outlet.

Example 19 can include, or can optionally be combined with the subject matter of one or any combination of Examples 17 or 18 to optionally include the nozzle cartridge itself having the coolant outlet.

Example 20 can include, or can optionally be combined with the subject matter of one or any combination of Examples 17 through 19 to optionally include the coolant source configured to supply the coolant gas at a temperature that is at least 30° C. less than the flow threshold temperature of the thermoplastic material in the extrusion tip of the nozzle cartridge when the coolant gas contacts the thermoplastic material at the extrusion tip of the nozzle cartridge.

Example 21 can include, or can optionally be combined with the subject matter of one or any combination of Examples 17 through 20 to optionally include the coolant source configured to supply at least one of carbon dioxide, argon, nitrogen, a fluoroalkane gas, or pressurized ambient air, via the coolant outlet.

Example 22 can include, or can optionally be combined with the subject matter of one or any combination of Examples 17 through 21 to optionally include a heated gas source configured to supply a heating gas via a heating gas outlet, the heating gas having a temperature that is higher than the flow threshold temperature of the thermoplastic material, and the heating gas outlet is configured to direct the heating gas from the heated gas source to contact the thermoplastic material at the extrusion tip of the nozzle cartridge.

Example 23 can include, or can optionally be combined with the subject matter of Example 22, to optionally include the heated gas source configured to supply the heating gas at a temperature that is at least 30° C. greater than the flow threshold temperature of the thermoplastic material in the extrusion tip of the nozzle cartridge when the heating gas contacts the thermoplastic material at the extrusion tip of the nozzle cartridge.

Example 24 can include, or can optionally be combined with the subject matter of one or any combination of Examples 17 through 23 to optionally include a temperature sensor configured to sense a temperature of the extrusion tip of the nozzle cartridge, and the coolant outlet is configured to release the coolant gas or inhibit the release of the coolant gas based on the temperature of the extrusion tip sensed by the temperature sensor.

Example 25 can include, or can optionally be combined with the subject matter of one or any combination of Examples 17 through 24 to optionally include a thermoplastic material drive assembly configured to receive a filament thermoplastic material and to drive the filament thermoplastic material through a liquefier assembly and toward the extrusion tip of the nozzle cartridge, and a trigger circuit configured to initiate release of the coolant gas from the coolant source via the coolant outlet when the thermoplastic material drive assembly stops driving the filament thermoplastic material through the liquefier assembly.

Example 26 can include, or can optionally be combined with the subject matter of one or any combination of Examples 17 through 25 to optionally include a timer circuit configured to measure a duration of release of the coolant gas from the coolant source via the coolant outlet, and to inhibit the release of the coolant gas when the release duration exceeds a specified duration.

Example 27 can include or use subject matter (such as an apparatus, a method, a means for performing acts, or a device readable medium including instructions that, when performed by the device, can cause the device to perform acts), such as can include or use a method for initiating or inhibiting flow of a thermoplastic material in an additive manufacturing system, the additive manufacturing system including an extrusion head assembly configured to deposit at least first and second different thermoplastic materials using respective first and second extrusion tips corresponding to respective first and second nozzle cartridges. The method of Example 27 can include heating at least a portion of the first nozzle cartridge to greater than a flow threshold temperature of the first thermoplastic material in the first extrusion tip, when the first nozzle cartridge is inside of a build area of the additive manufacturing system, to enable the first thermoplastic material to flow from the first extrusion tip to create a portion of a part composite, and after a first portion of a build process is completed using the first thermoplastic material from the first nozzle cartridge, contacting an unused portion of the first thermoplastic material remaining at the first extrusion tip with a coolant gas stream having a temperature at the first extrusion tip that is less than the flow threshold temperature of the first thermoplastic material.

Example 28 can include, or can optionally be combined with the subject matter of Example 27, to optionally include heating at least a portion of the second nozzle cartridge to greater than a flow threshold temperature of the second thermoplastic material in the second extrusion tip, when the second nozzle cartridge is inside of the build area of the additive manufacturing system, to enable the second thermoplastic material to flow from the second extrusion tip to create a different portion of the part composite.

Example 29 can include, or can optionally be combined with the subject matter of one or any combination of Examples 27 or 28 to optionally include, with the heating the portion of the first nozzle cartridge to greater than the flow threshold temperature of the first thermoplastic material, contacting an initial portion of the first thermoplastic material at the first extrusion tip with a heating gas stream having a temperature at the first extrusion tip that is greater than the flow threshold temperature of the first thermoplastic material.

Example 30 can include, or can optionally be combined with the subject matter of one or any combination of Examples 27 through 29 to optionally include relocating the first nozzle cartridge to a cooling area of the additive manufacturing system after the first portion of the build process is completed, the cooling area including a location where the coolant gas stream and the unused portion of the first thermoplastic material meet. In Example 30, the contacting the unused portion of the first thermoplastic material remaining at the first extrusion tip with the coolant gas stream can include providing the coolant gas stream only after the first nozzle cartridge is relocated from the build area to the cooling area of the additive manufacturing system.

Example 31 can include, or can optionally be combined with the subject matter of one or any combination of Examples 27 through 30 to optionally include sensing a temperature of the first extrusion tip after contacting the initial portion of the first thermoplastic material with the cooling gas stream and, when the sensed temperature exceeds a specified threshold temperature, terminating the coolant gas stream.

Example 32 can include, or can optionally be combined with the subject matter of one or any combination of Examples 27 through 31 to optionally include timing an interval beginning when the coolant gas stream first contacts the unused portion of the first thermoplastic material remaining at the first extrusion tip and, when the interval exceeds a specified duration, terminating the coolant gas stream.

Each of these non-limiting examples can stand on its own, or can be combined in various permutations or combinations with one or more of the other examples.

Method examples described herein can be machine or computer-implemented at least in part. For example, the control circuit 190, or some other controller or processor circuit, can be used to implement at least a portion of one or more of the methods discussed herein. Some examples can include a tangible, computer-readable medium or machine-readable medium encoded with instructions that are operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A material flow regulator apparatus for regulating a material flow from a nozzle cartridge, the nozzle cartridge configured to selectively deposit a thermoplastic material when used in an additive manufacturing system, the apparatus comprising:
   a gas source manifold including a first gas outlet positioned in or adjacent to a build area of the additive manufacturing system, the first gas outlet configured to selectively release a coolant gas, the selectively-released coolant gas having a temperature that is less than a flow threshold temperature of the thermoplastic material; and
   a positioning device configured to position an extrusion tip region of the nozzle cartridge adjacent to the first gas outlet such that the selectively-released coolant gas from the first gas outlet contacts an un-deposited portion of the thermoplastic material that is present at the extrusion tip of the nozzle cartridge, and wherein the first gas outlet is stationary relative to a movable extrusion tip of the nozzle cartridge.

2. The apparatus of claim 1, wherein the selectively-released coolant gas from the first gas outlet has a temperature that is at least 30° C. less than the flow threshold temperature of the thermoplastic material in the extrusion tip of the nozzle cartridge when the gas contacts the portion of the extrusion tip region of the nozzle cartridge.

3. The apparatus of claim 1, wherein the selectively-released coolant gas from the first gas outlet includes at least one of carbon dioxide, argon, nitrogen, a fluoroalkane gas, or pressurized ambient air.

4. The apparatus of claim 1, wherein the first gas outlet is further configured to release a heating gas having a temperature that is greater than a flow threshold temperature of a thermoplastic material in an extrusion tip of the nozzle cartridge.

5. The apparatus of claim 4, wherein the selectively-released heating gas from the first gas outlet has a temperature that is at least 30° C. greater than the flow threshold temperature of the thermoplastic material in the extrusion tip of the nozzle cartridge when the heating gas contacts the portion of the extrusion tip region of the nozzle cartridge.

6. The apparatus of claim 1, further comprising a second gas outlet positioned in or adjacent to the build area of the additive manufacturing system, wherein the second gas outlet is selectively controlled by a processor circuit to release the same or different coolant gas from the first gas outlet.

7. The apparatus of claim 1, further comprising a temperature sensor configured to sense a temperature of an extrusion tip of the nozzle cartridge, and wherein the gas outlet is configured to release the coolant gas or inhibit the release of the coolant gas based on the temperature of the extrusion tip sensed by the temperature sensor.

8. The apparatus of claim 7, wherein the temperature sensor is configured to sense the temperature of the extrusion tip of the nozzle cartridge when the extrusion tip of the nozzle cartridge is positioned at the gas outlet.

9. The apparatus of claim 1, further comprising a proximity trigger circuit configured to initiate release of the coolant gas from the gas outlet when an extrusion tip of the nozzle cartridge is within a specified first distance from the gas outlet, and further configured to inhibit release of the coolant gas from the gas outlet when the distance between the extrusion tip and the gas outlet is greater than a specified second distance from the gas outlet.

10. The apparatus of claim 1, further comprising:
   a thermoplastic material drive assembly configured to receive a filament thermoplastic material and to drive the filament thermoplastic material through a liquefier assembly and toward the extrusion tip of the nozzle cartridge; and
   a trigger circuit configured to initiate release of the coolant gas from the gas outlet when the thermoplastic material drive assembly stops driving the filament thermoplastic material through the liquefier assembly.

11. A material flow regulator apparatus for regulating a material flow from a nozzle cartridge, the nozzle cartridge configured to selectively deposit a thermoplastic material when used in an additive manufacturing system, the apparatus comprising:
   a gas source manifold including a first gas outlet positioned in or adjacent to a build area of the additive manufacturing system, the first gas outlet configured to selectively release a coolant gas, the selectively-released coolant gas having a temperature that is less than a flow threshold temperature of the thermoplastic material;
   a positioning device configured to position an extrusion tip region of the nozzle cartridge adjacent to the first gas outlet such that the selectively-released coolant gas from the first gas outlet contacts an un-deposited portion of the thermoplastic material that is present at the extrusion tip of the nozzle cartridge; and
   a timer circuit configured to measure a duration of release of the coolant gas from the gas outlet, and to inhibit the release of the coolant gas when the release duration exceeds a specified duration.

12. The apparatus of claim 1, wherein the positioning device includes a robotic arm configured to move an extrusion tip of the nozzle cartridge between a build area of the additive manufacturing system and an area of the additive manufacturing system that includes the gas outlet.

13. A material flow regulator apparatus for regulating a material flow from a nozzle cartridge, the nozzle cartridge configured to selectively deposit a thermoplastic material when used in an additive manufacturing system, the apparatus comprising:

a gas source manifold including a first gas outlet positioned in or adjacent to a build area of the additive manufacturing system, the first gas outlet configured to selectively release a coolant gas, the selectively-released coolant gas having a temperature that is less than a flow threshold temperature of the thermoplastic material; and a positioning device configured to position an extrusion tip region of the nozzle cartridge adjacent to the first gas outlet such that the selectively-released coolant gas from the first gas outlet contacts an un-deposited portion of the thermoplastic material that is present at the extrusion tip of the nozzle cartridge wherein the extrusion tip of the nozzle cartridge is stationary relative to a movable first gas outlet.

14. A method of operating the material flow regulator apparatus of claim 1, the method comprising:

selectively releasing the coolant gas from the first gas outlet; and positioning the extrusion tip region of the nozzle cartridge adjacent to the first gas outlet such that the selectively-released coolant gas from the first gas outlet contacts the un-deposited portion of the thermoplastic material that is present at the extrusion tip of the nozzle cartridge.

15. The method of claim 14, further comprising sensing a temperature of the extrusion tip of the nozzle cartridge.

16. The method of claim 15, further comprising releasing the coolant gas or inhibiting the release of the coolant gas based on the temperature of the extrusion tip sensed by the temperature sensor.

17. The method of claim 16, further comprising sensing the temperature of the extrusion tip of the nozzle cartridge when the extrusion tip of the nozzle cartridge is positioned at the gas outlet.

18. The method of claim 14, further comprising initiating release of the coolant gas from the gas outlet when the extrusion tip of the nozzle cartridge is within a specified first distance from the gas outlet.

19. The method of claim 18, further comprising inhibiting release of the coolant gas from the gas outlet when the distance between the extrusion tip and the gas outlet is greater than a specified second distance from the gas outlet.

20. The apparatus of claim 11, wherein the selectively-released coolant gas from the first gas outlet has a temperature that is at least 30° C. less than the flow threshold temperature of the thermoplastic material in the extrusion tip of the nozzle cartridge when the gas contacts the portion of the extrusion tip region of the nozzle cartridge.

* * * * *